(12) United States Patent
Goto et al.

(10) Patent No.: US 11,265,912 B2
(45) Date of Patent: Mar. 1, 2022

(54) TERMINAL APPARATUS

(71) Applicants: SHARP KABUSHIKI KAISHA, Sakai (JP); FG Innovation Company Limited, Tuen Mun (HK)

(72) Inventors: Jungo Goto, Sakai (JP); Osamu Nakamura, Sakai (JP); Seiji Sato, Sakai (JP); Yasuhiro Hamaguchi, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/050,201

(22) PCT Filed: Apr. 25, 2019

(86) PCT No.: PCT/JP2019/017747
§ 371 (c)(1),
(2) Date: Oct. 23, 2020

(87) PCT Pub. No.: WO2019/208719
PCT Pub. Date: Oct. 31, 2019

(65) Prior Publication Data
US 2021/0076409 A1    Mar. 11, 2021

(30) Foreign Application Priority Data

Apr. 27, 2018    (JP) .............................. JP2018-086484

(51) Int. Cl.
*H04W 72/14*    (2009.01)
*H04W 76/38*    (2018.01)
(Continued)

(52) U.S. Cl.
CPC ........... *H04W 72/14* (2013.01); *H04L 1/0003* (2013.01); *H04L 1/1819* (2013.01); *H04W 72/1289* (2013.01); *H04W 76/38* (2018.02)

(58) Field of Classification Search
None
See application file for complete search history.

(56) References Cited

U.S. PATENT DOCUMENTS

2018/0279358 A1*    9/2018    Babaei ............... H04W 72/0453
2019/0098612 A1*    3/2019    Babaei ............... H04W 72/1289
(Continued)

OTHER PUBLICATIONS

Vivo, "Discussion on handling UL multiplexing of transmissions with different reliability requirements", R1-1803848 3GPP TSG RAN WG1 Meeting #92bis, Sanya, China, Apr. 16-20, 2018.
(Continued)

*Primary Examiner* — Anh Vu H Ly
(74) *Attorney, Agent, or Firm* — ScienBiziP, P.C.

(57) ABSTRACT

A terminal apparatus includes a control information detection unit configured to detect first and second DCI, and a transmitter configured to perform UL data transmission based on the first DCI or cancel a resource allocated in the second DCI. A UL grant using the first DCI is detected, when performing UL data transmission based on the UL grant, after the data transmission, a first timer for a corresponding HARQ process is started and a second timer is stopped, and when the first timer expires, the second timer for a HARQ process is started. When cancellation of the UL data transmission using the second DCI is detected, at a timing for the data transmission canceled, the second timer is restarted in a case that the first timer expires and the second timer is running, and the second timer is started in a case that the second timer is not running.

7 Claims, 14 Drawing Sheets

(51) Int. Cl.
*H04L 1/00* (2006.01)
*H04L 1/18* (2006.01)
*H04W 72/12* (2009.01)

(56) References Cited

U.S. PATENT DOCUMENTS

2019/0306848 A1* 10/2019 Zhou .................... H04W 72/042
2019/0363833 A1* 11/2019 Wang .................... H04L 5/0082
2020/0008216 A1* 1/2020 Iyer ....................... H04W 72/04

OTHER PUBLICATIONS

Vivo, "Summary of handling UL multiplexing of transmission with different reliability requirements", R1-1805629 3GPP TSG RAN WG1 Meeting #92bis, Sanya, China, Apr. 16-20, 2018.

* cited by examiner

TERMINAL APPARATUS

FIELD

The present disclosure relates to a terminal apparatus.

This application claims priority based on JP 2018-086484 filed on Apr. 27, 2018, the contents of which are incorporated herein by reference.

BACKGROUND

In recent years, 5th Generation (5G) mobile telecommunication systems have been focused on, and a communication technology is expected to be specified, the technology establishing MTC mainly based on a large number of terminal apparatuses (Massive Machine Type Communications; mMTC), Ultra-reliable and low latency communications (URLLC), and enhanced Mobile BroadBand (eMBB). The 3rd Generation Partnership Project (3GPP) has been studying New Radio (NR) as a 5G communication technique and discussing NR Multiple Access (MA).

In 5G, Internet of Things (IoT) is expected to be established that allows connection of various types of equipment not previously connected to a network, and establishment of mMTC is an important issue. In 3GPP, a Machine-to-Machine (M2M) communication technology has already been standardized as Machine Type Communication (MTC) that accommodates terminal apparatuses transmitting and/or receiving small size data (NPL 1). Furthermore, in order to support data transmission at a low rate in a narrow band, standardization of Narrow Band-IoT (NB-IoT) has been conducted (NPL 2). 5G is expected to accommodate more terminals than the above-described standards and to accommodate IoT equipment requiring ultra-reliable and low-latency communications.

On the other hand, in communication systems such as Long Term Evolution (LTE) and LTE-Advanced (LTE-A) which are specified by the 3GPP, terminal apparatuses (User Equipment (UE)) use a Random Access Procedure, a Scheduling Request (SR), and the like, to request a radio resource for transmitting uplink data to a base station apparatus (also referred to as a Base Station (BS) or an evolved Node B (eNB)). The base station apparatus provides uplink grant (UL Grant) to each terminal apparatus based on an SR. In a case that the terminal apparatus receives an UL Grant as control information from the base station apparatus, the terminal apparatus transmits uplink data using a prescribed radio resource (referred to as Scheduled access, grant-based access, or transmission by dynamic scheduling, and hereinafter referred to as scheduled access), based on uplink transmission parameters included in the UL Grant. In this manner, the base station apparatus controls all uplink data transmissions (the base station apparatus knows radio resources for uplink data transmitted by each terminal apparatus). In the scheduled access, the base station apparatus can establish Orthogonal Multiple Access (OMA) by controlling uplink radio resources.

5G mMTC includes a problem in that the use of the scheduled access increases the amount of control information. URLLC includes a problem in that the use of the scheduled access increases delay. Use of grant free access (also referred to as grant less access, Contention-based access, Autonomous access, Resource allocation for uplink transmission without grant, type 1 configured grant transmission, or the like, and hereinafter referred to as grant free access) and semi-persistent scheduling (SPS, also referred to as Type 2 configured grant transmission, or the like) is under study. In the grant free access, the terminal apparatus transmits data without performing random access procedure or SR transmission and without performing UL Grant reception, or the like (NPL 3). In the grant free access, increased overhead associated with control information can be suppressed even in a case that a large number of devices transmit small size data. Furthermore, in the grant free access, no UL Grant reception or the like is performed, and thus, the time from generation to transmission of transmission data can be shortened. In the SPS, some of the transmission parameters are notified by way of higher-layer control information, and transmission parameters not notified by the higher layer and an UL Grant for activation indicating allowance of use of a periodic resource are notified to enable the data transmission.

On the other hand, in a downlink, a resource allocated for data transmission in eMBB can be used for data transmission in URLLC. The base station apparatus notifies a destination UE in the downlink eMBB of Pre-emption control information, and uses a pre-empted resource for the downlink URLLC data transmission. On the other hand, the terminal apparatus that detects the Pre-emption control information for a resource scheduled for downlink data reception determines that there is no downlink data addressed to the terminal apparatus itself in the resource specified by the Pre-emption. Multiplex of eMBB and URLLC data between different terminal apparatuses in the uplink is also under study. In addition, multiplex of eMBB and URLLC data in a case that one terminal apparatus has traffic of eMBB and URLLC is also under study.

In the case of multiplex of eMBB and URLLC data between different terminal apparatuses (Inter-UE), the base station apparatus can notify, in advance, of changing a radio resources scheduled in the UL Grant for eMBB uplink data transmission to for URLLC data transmission using a DCI format. In this case, the terminal apparatus scheduled with the radio resource for eMBB uplink data transmission cannot use at least a radio resource used for URLLC data transmission by another terminal apparatus. Here, the terminal apparatus may stop the data transmission after detecting the notification of the radio resource used for the URLLC data transmission by another terminal apparatus using the DCI. In a case that the terminal apparatus stops the data transmission in response to the notification of the radio resource used for the URLLC data transmission by another terminal apparatus using the DCI, the base station apparatus and the terminal apparatus known that the data transmission is stopped, and thus, may not transmit the ACK/NACK.

CITATION LIST

Non Patent Literature

NPL 1: 3GPP, TR36.888 V12.0.0, "Study on provision of low-cost Machine-Type Communications (MTC) User Equipments (UEs) based on LTE," June 2013

NPL 2: 3GPP, TR45.820 V13.0.0, "Cellular system support for ultra-low complexity and low throughput Internet of Things (CIoT)," August 2015

NPL 3: GPP, TS38.214 V15.1.0, "Physical layer procedures for data (Release 15)," March 2018

SUMMARY

Problem

In a case that the base station apparatus does not transmit the ACK/NACK to the terminal apparatus stopping the data transmission, the terminal apparatus needs to wait for the DCI to retransmit the data stopped from transmission. However, in a case that the data transmission is stopped by way of the DCI from the base station apparatus, a timer for waiting for the DCI is not started, and the terminal apparatus has a problem that a period of waiting for the DCI is not configured. Furthermore, there is a problem in that the power consumption increases in a case that a SR is transmitted due to the data stopped by the terminal apparatus from transmission.

An aspect of the present disclosure has been made in view of such circumstances, and an object thereof is to provide a terminal apparatus capable of implementing a procedure efficient in retransmission of data in a case the data transmission is stopped.

Solution to Problem

To address the above-mentioned problems, a terminal apparatus according to an aspect of the present disclosure is configured as follows.

An aspect of the present disclosure is a terminal apparatus for communicating with a base station apparatus, the terminal apparatus including a control information detection unit configured to detect a first DCI format and a second DCI format, and a transmitter configured to perform uplink data transmission based on the first DCI format or cancel a resource scheduled, by using the second DCI format, wherein the control information detection unit detects an uplink grant for the uplink data transmission using the first DCI format, in a case of performing corresponding uplink data transmission based on the uplink grant, the transmitter, after the uplink data transmission, starts a first timer for a corresponding HARQ process and stops a second timer for the corresponding HARQ process, and in a case that the first timer expires, the transmitter starts the second timer for the corresponding HARQ process, and in a case that cancellation of the uplink data transmission based on the uplink grant using the second DCI format is detected, the transmitter, at a timing for the corresponding data transmission canceled, restarts the second timer in a case that the first timer for the corresponding HARQ process expires and the second timer is running, and starts the second timer in a case that the second timer is not running.

In an aspect of the present disclosure, different periods are configured for a second timer configured to start after the first timer expires and for a second timer configured to start at the timing for the corresponding data transmission canceled.

In an aspect of the present disclosure, a third timer is provided, the third timer being configured to start in a case that the uplink grant using the first DCI format is detected, and in a case that cancellation of the uplink data transmission based on the uplink grant using the second DCI format is detected, the third timer is restarted.

In an aspect of the present disclosure, different periods are configured for a third timer configured to start in a case that the uplink grant using the first DCI format is detected and a third timer configured to restart in a case that cancellation of the uplink data transmission based on the uplink grant using the second DCI format is detected.

In an aspect of the present disclosure, in a case that cancellation of the uplink data transmission based on the uplink grant using the second DCI format is detected, the uplink data transmission is performed based on a transmission timing included in the second DCI format and a transmission parameter included in the first DCI format.

In an aspect of the present disclosure, in a case that cancellation of the uplink data transmission based on the uplink grant using the second DCI format is detected, the uplink data transmission is performed based on a transmission timing and a modulation and coding scheme (MCS), and a frequency domain resource assignment included in the second DCI format, and a transmission parameter that is not included in the second DCI format, but included in the first DCI format.

In an aspect of the present disclosure, in a case of cancellation of the uplink data transmission based on the uplink grant using the second DCI format is detected, an uplink grant for reallocation is detected based on a notification timing for the uplink grant included in the second DCI format.

Advantageous Effects

According to one or more aspects of the present disclosure, an efficient uplink data transmission can be achieved.

DESCRIPTION

Figure 1:
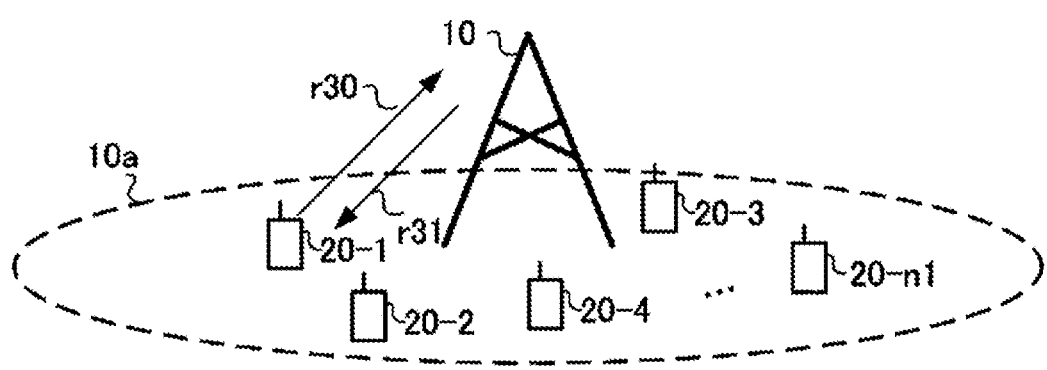
FIG. 1 is a diagram illustrating an example of a communication system according to a first implementation.

A communication system according to the present implementations includes a base station apparatus (also referred to as a cell, a small cell, a pico cell, a serving cell, a component carrier, an eNodeB (eNB), a Home eNodeB, a Low Power Node, a Remote Radio Head, a gNodeB (gNB), a control station, a Bandwidth Part (BWP), or a Supplementary Uplink (SUL)), and a terminal apparatus (also referred to as a terminal, a mobile terminal, a mobile station, or User Equipment (UE)). In the communication system, in case of a downlink, the base station apparatus serves as a transmitting apparatus (a transmission point, a transmit antenna group, or a transmit antenna port group), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication between the terminal apparatus and the base station apparatus, the communication involving human beings, but is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multi-carrier transmission scheme such as Discrete Fourier Transform Spread-Orthogonal Frequency Division Multiplexing (DFTS-OFDM, also referred to as Single Carrier-Frequency Division Multiple Access (SC-FDMA)) and Cyclic Prefix-Orthogonal Frequency Division Multiplexing (CP-OFDM). The communication system can also use Filter Bank Multi Carrier (FBMC), Filtered-OFDM (f-OFDM) to which a filter is applied, Universal Filtered-OFDM (UF-OFDM), or Windowing-OFDM (W-OFDM), a transmission scheme using a sparse code (Sparse Code Multiple Access (SCMA)), or the like. Furthermore, the communication system may apply DFT precoding and use a signal waveform for which the filter described above is used. Furthermore, the communication system may apply code spreading, interleaving, the sparse code, and the like in the above-described transmission scheme. It's noted that, in the description below, at least one of the DFTS-OFDM transmission and the CP-OFDM transmission is used in the uplink, whereas the CP-OFDM transmission is used in the downlink, but that the present implementations are not limited to this configuration and any other transmission scheme is applicable.

The base station apparatus and the terminal apparatus according to the present implementations can communicate in a frequency band for which an approval of use (license) has been obtained from the government of a country or region where a radio operator provides services, that is, a so-called licensed band, and/or in a frequency band for which no approval (license) from the government of the country or region is required, that is, a so-called unlicensed band. In the unlicensed band, communication may be based on carrier sense (e.g., a listen before talk scheme).

According to the present implementations, "X/Y" includes the meaning of "X or Y". According to the present implementations, "X/Y" includes the meaning of "X and Y". According to the present implementations, "X/Y" includes the meaning of "X and/or Y".

First Implementation

FIG. 1 is a diagram illustrating an example of a configuration of a communication system according to the present implementation. The communication system according to the present implementation includes a base station apparatus 10 and terminal apparatuses 20-1 to 20-$n1$ ($n1$ is a number of terminal apparatuses connected to the base station apparatus 10). The terminal apparatuses 20-1 and 20-$n1$ are also collectively referred to as terminal apparatuses 20. Coverage 10$a$ is a range (a communication area) in which the base station apparatus 10 can connect to the terminal apparatus 20 (coverage 10$a$ is also referred to as a cell).

In FIG. 1, radio communication of an uplink r30 includes at least the following uplink physical channels. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is a physical channel that is used to transmit Uplink Control Information (UCI). The uplink control information includes a positive acknowledgement (ACK)/Negative acknowledgement (NACK) in response to downlink data (a Downlink transport block, a Medium Access Control Protocol Data Unit (MAC PDU), a Downlink-Shared Channel (DL-SCH), and a Physical Downlink Shared Channel (PDSCH). The ACK/NACK is also referred to as a Hybrid Automatic Repeat request ACKnowledgement (HARQ-ACK), a HARQ feedback, a HARQ response, or a signal indicating HARQ control information or a delivery confirmation.

The uplink control information includes a Scheduling Request (SR) used to request a PUSCH (Uplink-Shared Channel (UL-SCH)) resource for initial transmission. The scheduling request includes a positive scheduling request or a negative scheduling request. The positive scheduling request indicates that a UL-SCH resource for initial transmission is requested. The negative scheduling request indicates that the UL-SCH resource for the initial transmission is not requested.

The uplink control information includes downlink Channel State Information (CSI). The downlink channel state information includes a Rank Indicator (RI) indicating a preferable spatial multiplexing order (the number of layers), a Precoding Matrix Indicator (PMI) indicating a preferable precoder, a Channel Quality Indicator (CQI) designating a preferable transmission rate, and the like. The PMI indicates a codebook determined by the terminal apparatus. The codebook is related to precoding of the physical downlink shared channel. The CQI can use an index (CQI index) indicative of a preferable modulation scheme (for example, QPSK, 16QAM, 64QAM, 256QAM, or the like), a preferable coding rate, and a preferable frequency utilization efficiency in a prescribed band. The terminal apparatus selects, from the CQI table, a CQI index considered to allow a transport block on the PDSCH to be received within a prescribed block error probability (for example, an error rate of 0.1). Here, the terminal apparatus may have multiple prescribed error probabilities (error rates) for transport blocks. For example, an error rate for eMBB data may be targeted at 0.1 and an error rate for URLLC may be targeted 0.00001. The terminal apparatus may perform CSI feedback for each target error rate (transport block error rate) configured by the higher layer (e.g., setup through RRC signaling from the base station), or may perform CSI feedback for a target error rate of multiple target error rates configured by the higher layer. It's noted that the CSI may be calculated using an error rate not for eMBB (e.g. 0.1) on the basis of not whether or not the error rate is configured through RRC signaling but whether or not a CQI table not for eMBB (that is, transmissions where the BLER does not exceed 0.1) is selected.

PUCCH formats 0 to 4 are defined for the PUCCH, and PUCCH formats 0 and 2 are transmitted in 1 to 2 OFDM symbols and PUCCH formats 1, 3, and 4 are transmitted in 4 to 14 OFDM symbols. PUCCH formats 0 and 1 are used for up to 2-bit notification, and can notify only the HARQ-ACK, only the SR, or simultaneously the HARQ-ACK and the SR. PUCCH formats 1, 3, and 4 are used for notification of bits the number of which is larger than two, and can simultaneously notify the HARQ-ACK, the SR, and the CSI. The number of OFDM symbols used for PUCCH transmission is configured by a higher layer (e.g., setup through RRC signaling), and the use of any PUCCH format depends on whether there is SR transmission or CSI transmission at the timing at which the PUCCH is transmitted (slot, OFDM symbol).

The PUSCH is a physical channel that is used to transmit uplink data (Uplink Transport Block, Uplink-Shared Channel (UL-SCH)). The PUSCH may be used to transmit the HARQ-ACK in response to the downlink data and/or the channel state information along with the uplink data. The PUSCH may be used to transmit only the channel state information. The PUSCH may be used to transmit only the HARQ-ACK and the channel state information.

The PUSCH is used to transmit radio resource control (Radio Resource Control (RRC)) signaling. The RRC signaling is also referred to as an RRC message/RRC layer information/RRC layer signaling/an RRC layer parameter/RRC information/an RRC information element. The RRC signaling is information/signal processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment-specific (UE-specific) information may be transmitted through signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a Power Headroom (PH) may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as a higher layer signal (higher layer signaling). The RRC signaling and/or the MAC CE are included in a transport block.

The PUSCH may be used for data transmission of dynamic scheduling for performing uplink data transmission on a specified radio resource (allocation of an aperiodic radio resource), based on uplink transmission parameters (e.g., time-domain resource allocation, frequency-domain resource allocation, and the like) included in the DCI format. The PUSCH may be used for data transmission based on Semi-Persistent scheduling (SPS) Type 2 (Configured uplink grant type 2) by which data transmission using a periodic radio resource is granted, by, through the RRC, receiving the TransformPrecoder (precoder), nrofHARQ (the number of HARQ processes), and repK-RV (a redundancy version pattern in repetitive transmission of the same data), and thereafter, receiving DCI format 0_0/0_1 with CRC scrambled with a CS-RNTI, and further receiving activation control information with the received DCI format 0_0/0_1 having a prescribed field configured with Validation. Here, all bits for a HARQ process number, 2 bits for a RV, and the like may be used as a field used for the Validation. Furthermore, all bits of a HARQ process number, all bits of an MCS, all bits of a resource block assignment, 2 bits of a RV, and the like may be used as a field used for Validation of deactivation (release) control information for a type 2 configured grant transmission. The PUSCH may be further used for a type 1 configured grant transmission by which a periodic data transmission is granted by, through the RRC, receiving rrcConfiguredUplinkGrant in addition to the information of the type 2 configured grant transmission. The rrcConfiguredUplinkGrant information may include the time-domain resource allocation, a time-domain offset, the frequency-domain resource allocation, a DMRS configuration, and the number of repetitive transmissions of the same data (repK). In a case that the type 1 configured grant transmission and the type 2 configured grant transmission are configured in the same serving cell (in the component carrier), the type 1 configured grant transmission may be prioritized. In a case that an uplink grant for the type 1 configured grant transmission and an uplink grant for the dynamic scheduling overlap in the time domain in the same serving cell, the uplink grant for the dynamic scheduling may override (that is, the dynamic scheduling only is used and the uplink grant for the type 1 configured grant transmission is reversed). The multiple uplink grants overlapping in the time domain may refer to at least some of the OFDM symbols overlapping, or portions of the times in the OFDM symbols overlapping because an OFDM symbol length differs in a case that a subcarrier spacing (SCS) is different. The configuration of the type1 configured grant transmission can also be configured for the Scell that has not been activated through the RRC, and the uplink grant for the type1 configured grant transmission may be validated after the Scell configured with the type1 configured grant transmission is activated.

The PRACH is used to transmit a preamble used for random access. The PRACH is used for indicating the initial connection establishment procedure, the handover procedure, the connection re-establishment procedure, synchronization (timing adjustment) for uplink transmission, and the request for the PUSCH (UL-SCH) resource.

In the uplink radio communication, an Uplink Reference Signal (UL RS) is used as an uplink physical signal. The uplink reference signal includes a Demodulation Reference Signal (DMRS) and a Sounding Reference Signal (SRS). The DMRS is associated with transmission of the physical uplink-shared channel/physical uplink control channel. For example, the base station apparatus 10 uses the demodulation reference signal to perform channel estimation/channel compensation in a case of demodulating the physical uplink-shared channel/the physical uplink control channel. For an uplink DMRS, the maximum number of OFDM symbols for front-loaded DMRS and a configuration for the DMRS symbol addition (DMRS-add-pos) are specified by the base station apparatus through the RRC. In a case that the front-loaded DMRS is in 1 OFDM symbol (single symbol DMRS), a frequency domain location, cyclic shift values in the frequency domain, and how different frequency domain locations are used in the OFDM symbol including the DMRS are specified in the DCI, and in a case that the front-loaded DMRS is in 2 OFDM symbols (double symbol DMRS), a configuration for a time spread of a length 2 is specified in the DCI in addition to the above.

The Sounding Reference Signal (SRS) is not associated with the transmission of the physical uplink shared channel/ physical uplink control channel. In other words, with or without uplink data transmission, the terminal apparatus transmits periodically or aperiodically the SRS. In the periodic SRS, the terminal apparatus transmits the SRS based on parameters notified through signaling (e.g., RRC) from a layer higher than the base station apparatus. On the other hand, in the aperiodic SRS, the terminal apparatus transmits the SRS based on parameters notified through signaling (e.g., RRC) from a layer higher than the base station apparatus and a physical downlink control channel (for example, DCI) indicating a transmission timing of the SRS. The base station apparatus 10 uses the SRS to measure an uplink channel state (CSI Measurement). The base station apparatus 10 may perform timing alignment and closed loop transmission power control from measurement results obtained by receiving the SRS.

In FIG. 1, at least the following downlink physical channels are used in radio communication of the downlink r31. The downlink physical channels are used for transmitting information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast Channel (BCH)) that is used commonly by the terminal apparatuses. The MIB is one of pieces of system information. For example, the MIB includes a downlink transmission bandwidth configuration and a System Frame number (SFN). The MIB may include information indicating at least some of numbers of a slot, a subframe, and a radio frame in which a PBCH is transmitted.

The PDCCH is used to transmit Downlink Control Information (DCI). For the downlink control information, multiple formats based on applications (also referred to as DCI formats) are defined. The DCI format may be defined based on the type and the number of bits of the DCI constituting a single DCI format. The downlink control information includes control information for downlink data transmission and control information for uplink data transmission. The DCI format for downlink data transmission is also referred to as downlink assignment (or downlink grant, DL Grant). The DCI format for uplink data transmission is also referred to as uplink grant (or uplink assignment, UL Grant).

The DCI format for downlink data transmission includes DCI format 1_0, DCI format 1_1, and the like. DCI format 1_0 is for fallback downlink data transmission, and has configurable parameters (fields) fewer than DCI format 1_1 supporting MIMO and the like. DCI format 1_1 is capable of changing the presence or absence (valid/invalid) of the parameter (field) to be notified, and has the number of bits larger than that of DCI format 1_0 depending on the field to be valid. On the other hand, DCI format 1_1 is capable of notifying MIMO or multiple codewords transmission, ZP CSI-RS trigger, CBG transmission information, and the like, and a presence or absence, or the number of bits of some fields thereof are added in accordance with the configuration by the higher layer (e.g., RRC signaling, MAC CE). A single downlink assignment is used for scheduling a single PDSCH in a single serving cell. The downlink grant may be used for at least scheduling a PDSCH within the same slot/subframe as the slot/subframe in which the downlink grant has been transmitted. The downlink grant may be used for scheduling a PDSCH in a slot/subframe after $K_0$ slots/subframes from the slot/subframe in which the downlink grant has been transmitted. The downlink grant may be used for scheduling a PDSCH in multiple slots/subframes. The downlink assignment in DCI format 1_0 includes the following fields. For example, the relevant fields include a DCI format identifier, a frequency domain resource assignment (resource block allocation for the PDSCH, resource allocation), a time domain resource assignment, VRB to PRB mapping, a Modulation and Coding Scheme (MCS) for the PDSCH (information indicating a modulation order and a coding rate), a NEW Data Indicator (NDI) indicating an initial transmission or retransmission, information for indicating the HARQ process number in the downlink, a Redundancy version (RV) indicating information on redundant bits added to the codeword during error correction coding, Downlink Assignment Index (DAI), a Transmission Power Control (TPC) command for the PUCCH, a resource indicator for the PUCCH, an indicator for HARQ feedback timing from the PDSCH, and the like. It's noted that the DCI format for each downlink data transmission includes information (fields) required for the application among the above-described information. Either or both of DCI format 1_0 and DCI format 1_1 may be used for activation and deactivation (release) of the downlink SPS.

The DCI format for uplink data transmission includes DCI format 0_0, DCI format 0_1, and the like. DCI format 0_0 is for fallback uplink data transmission, and has configurable parameters (fields) fewer than DCI format 0_1 supporting MIMO and the like. DCI format 0_1 is capable of changing the presence or absence (valid/invalid) of the parameter (field) to be notified, and has the number of bits larger than that of DCI format 0_0 depending on the field to be valid. On the other hand, DCI format 0_1 is capable of notifying MIMO or multiple codewords transmission, a SRS resource indicator, precoding information, antenna port information, SRS request information, CSI request information, CBG transmission information, uplink PTRS association, DMRS sequence initialization, and the like, and a presence or absence, or the number of bits of some fields thereof are added in accordance with the configuration by the higher layer (e.g., RRC signaling). A single uplink grant is used for notifying the terminal apparatus of scheduling of a single PUSCH in a single serving cell. The uplink grant may be used for scheduling a PUSCH in a slot/subframe after $K_2$ slots/subframes from the slot/subframe in which the uplink grant has been transmitted. The downlink grant may be used for scheduling a PUSCH in multiple slots/subframes. The uplink grant in DCI format 0_0 includes the following fields. For example, the relevant fields include a DCI format identifier, a frequency domain resource assignment (information on resource block allocation for transmitting the PUSCH and a time domain resource assignment, a frequency hopping flag, information on the MCS for the PUSCH, RV, NDI, information indicating the HARQ process number in the uplink, a TPC command for the PUSCH, a Supplemental UL (UL/SUL) indicator, and the like. Either or both of DCI format 0_0 and DCI format 0_1 may be used for activation and deactivation (release) of the uplink SPS.

The DCI format may be used in DCI format 2_0 with CRC scrambled with an SFI-RNTI for notification of a slot format indicator (SFI). The DCI format may be used in DCI format 2_1 with CRC scrambled with an INT-RNTI for notification of a PRB (one or more) and an OFDM symbol (one or more) that the terminal apparatus may assume no downlink data transmission intended for the terminal apparatus itself. The DCI format may be used in DCI format 2_2 with CRC scrambled with a TPC-PUSCH-RNTI or a TPC-PUCCH-RNTI for TPC command transmission for the PUSCH and the PUCCH. The DCI format may be used in DCI format 2_3 with CRC scrambled with a TPC-SRS-RNTI for TPC command group transmission for SRS transmission by one or terminal apparatuses. DCI format 2_3 may also be used for the SRS request. The DCI format may be used in DCI format 2_X (for example, DCI format 2_4, DCI format 2_1A) with CRC scrambled with an INT-RNTI or another RNTI (e.g., UL-INT-RNTI) for notification of a PRB (one or more) and an OFDM symbol (one or more), among those already scheduled by UL Grant/Configured UL Grant, in which the terminal apparatus does not transmit data.

For the MCS for the PDSCH/PUSCH, an index (MCS index) indicating a modulation order and target coding rate for the PDSCH/the PUSCH can be used. The modulation order is associated with a modulation scheme. The modulation orders "2", "4", and "6" indicate "QPSK," "16QAM," and "64QAM," respectively. Furthermore, in a case that 256QAM and 1024QAM are configured by the higher layer (e.g., RRC signaling), the modulation orders "8" and "10" can be notified, and indicate "256QAM" and "1024QAM", respectively. The target coding rate is used to determine a transport block size (TBS) that is the number of bits to be transmitted, depending on the number of resource elements (the number of resource blocks) of the PDSCH/PUSCH scheduled in the PDCCH. A communication system 1 (the base station apparatus 10 and the terminal apparatus 20) shares a method of calculating the transport block size by the MCS, the target coding rate, and the number of resource elements (the number of resource blocks) allocated for the PDSCH/PUSCH transmission.

The PDCCH is generated by adding a Cyclic Redundancy Check (CRC) to the downlink control information. In the PDCCH, CRC parity bits are scrambled with a prescribed identifier (also referred to as an exclusive OR operation, mask). The parity bits are scrambled with a Cell-Radio Network Temporary Identifier (C-RNTI), a Configured Scheduling (CS)-RNTI, a Temporary C (TC)-RNTI, a Paging (P)-RNTI, a System Information (SI)-RNTI, a Random Access (RA)-RNTI, or with an INT-RNTI, a Slot Format Indicator (SFI)-RNTI, a TPC-PUSCH-RNTI, a TPC-PUCCH-RNTI, or a TPC-SRS-RNTI. The C-RNTI and the CS-RNTI are identifiers for identifying the terminal apparatus in a cell by the dynamic scheduling and the SPS/grant free access, respectively. The Temporary C-RNTI is an identifier for identifying the terminal apparatus that has transmitted a random access preamble in a contention based random access procedure. The C-RNTI and the Temporary C-RNTI are used to control PDSCH transmission or PUSCH transmission in a single subframe. The CS-RNTI is used to periodically allocate a resource for the PDSCH or the PUSCH. The P-RNTI is used to transmit a paging message (Paging Channel (PCH)). The SI-RNTI is used to transmit the SIB, and the RA-RNTI is used to transmit a random access response (message 2 in a random access procedure). The SFI-RNTI is used to notify a slot format. The INT-RNTI is used to notify a downlink or uplink Pre-emption. The TPC-PUSCH-RNTI and the TPC-PUCCH-RNTI, and the TPC-SRS-RNTI are used to notify transmission power control values of the PUSCH and the PUCCH, and the SRS, respectively. It's noted that the identifier may include a CS-RNTI for each configuration in order to configure multiple grant free accesses/SPSs. The DCI to which the CRC scrambled with the CS-RNTI is added can be used for activation, deactivation (release), parameter change, or retransmission control (ACK/NACK transmission) of the grant free access, and the parameter may include a resource configuration (a configuration parameter for a DMRS, a resource in a frequency domain and a time domain of the grant free access, an MCS used for the grant free access, the number of repetitions, with or without applying a frequency hopping, and the like).

The PDSCH is used to transmit the downlink data (the downlink transport block, DL-SCH). The PDSCH is used to transmit a system information message (also referred to as a System Information Block (SIB)). Some or all of the SIBs can be included in the RRC message.

The PDSCH is used to transmit the RRC signaling. The RRC signaling transmitted from the base station apparatus may be common to the multiple terminal apparatuses in the cell (unique to the cell). That is, the information common to the user equipments in the cell is transmitted using RRC signaling unique to the cell. The RRC signaling transmitted from the base station apparatus may be a message dedicated to a certain terminal apparatus (also referred to as dedicated signaling). In other words, user equipment-specific (UE-Specific) information may be transmitted using a message dedicated to the certain terminal apparatus.

The PDSCH is used to transmit the MAC CE. The RRC signaling and/or the MAC CE is also referred to as a higher layer signal (higher layer signaling). The PMCH is used to transmit multicast data (Multicast Channel (MCH)).

In the downlink radio communication in FIG. 1, a Synchronization signal (SS) and a Downlink Reference Signal (DL RS) are used as downlink physical signals.

The synchronization signal is used for the terminal apparatus to take synchronization in the frequency domain and the time domain in the downlink. The downlink reference signal is used for the terminal apparatus to perform the channel estimation/channel compensation on the downlink physical channel. For example, the downlink reference signal is used to demodulate the PBCH, the PDSCH, and the PDCCH. The downlink reference signal can be used for the terminal apparatus to measure the downlink channel state (CSI measurement). The downlink reference signal may include a Cell-specific Reference Signal (CRS), a Channel state information Reference Signal (CSI-RS), a Discovery Reference Signal (DRS), and a Demodulation Reference Signal (DMRS).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

In higher layer processing, processing is performed on a layer higher than the physical layer, such as a Medium Access Control (MAC) layer, a Packet Data Convergence Protocol (PDCP) layer, a Radio Link Control (RLC) layer, and a Radio Resource Control (RRC) layer.

Processing is performed on a layer higher than the physical layer, such as a Medium Access Control (MAC) layer, a Packet Data Convergence Protocol (PDCP) layer, a Radio Link Control (RLC) layer, and a Radio Resource Control (RRC) layer.

A higher layer processing unit configures various RNTIs for each terminal apparatus. The RNTI is used for encryption (scrambling) of the PDCCH, the PDSCH, and the like. In the higher layer processing, the downlink data (transport block, DL-SCH) allocated to the PDSCH, the system information specific to the terminal apparatus (System Information Block: SIB), the RRC message, the MAC CE, and the like are generated or acquired from the higher node and output. In the higher layer processing, various kinds of configuration information of the terminal apparatus 20 are managed. It's noted that a part of the function of the radio resource control may be performed in the MAC layer or the physical layer.

In the higher layer processing, information on the terminal apparatus, such as the function supported by the terminal apparatus (UE capability), is received from the terminal apparatus 20. The terminal apparatus 20 transmits its own function to the base station apparatus 10 by a higher layer signaling (RRC signaling). The information on the terminal apparatus includes information for indicating whether the terminal apparatus supports a prescribed function or information for indicating that the terminal apparatus has completed introduction and testing of the prescribed function. The information for indicating whether the prescribed function is supported includes information for indicating whether the introduction and testing of the prescribed function have been completed.

In a case that the terminal apparatus supports the prescribed function, the terminal apparatus transmits information (parameters) for indicating whether the prescribed function is supported. In a case that the terminal apparatus does not support a prescribed function, the terminal apparatus may not transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

In FIG. 1, the base station apparatus 10 and the terminal apparatuses 20 support, in the uplink, Multiple Access (MA) using the grant free access (also referred to grant free access, grant less access, Contention-based access, Autonomous access, Resource allocation for uplink transmission without grant, type 1 configured grant transmission, or the like, and hereinafter referred to as grant free access). The grant free access is a scheme in which the terminal apparatus transmits uplink data (such as a physical uplink channel) without performing a procedure to transmit a SR by the terminal apparatus and specifies a physical resource and transmission timing of data transmission by way of a UL Grant using the DCI by the base station apparatus (also referred to as UL Grant through L1 signaling). Thus, in addition to an allocation periodicity for available resources, a target received power, a value (a) of fractional TPC, the number of HARQ processes, and a RV pattern during repetitive transmission of the same transport, the terminal apparatus can receive, in advance through RRC signaling (SPS-config), a physical resource (resource assignment in the frequency domain, resource assignment in the time domain) that can be used for grant free access and a transmission parameter (that may include a cyclic shift or OCC of DMRS, an antenna port number, a position or the number of OFDM symbols in which DMRS is allocated, the number of repetitive transmissions of the same transport, and the like), as Configured Uplink Grant (rrcConfiguredUplinkGrant, configured uplink grant) in RRC signaling, and perform data transmission using the configured physical resource only in a case that the transmission data is in the buffer. In other words, in a case that the higher layer does not deliver transport blocks to transmit in the grant free access, data transmission in the grant free access is not performed. In a case that the terminal apparatus receives SPS-config, but does not receive Configured Uplink Grant through RRC signaling, the terminal apparatus can also perform similar data transmission in the SPS (type2 configured grant transmission) by SPS activation via the UL Grant.

There are following two types of grant free access. A first type is type 1 configured grant transmission (UL-TWG-type 1), that is a scheme in which the base station apparatus transmits transmission parameters for the grant free access to the terminal apparatus through higher layer signaling (e.g., RRC), and transmits start of grant (activation, RRC setup) and end of grant (deactivation (release), RRC release) of the data transmission in the grant free access, and change of the transmission parameters also through higher layer signaling. Here, the transmission parameters for the grant free access may include a physical resource (time domain and frequency domain resource assignment) that can be used for data transmission in the grant free access, a periodicity of the physical resource, an MCS, with or without applying repetitive transmission, the number of repetitions, an RV configuration for repetitive transmission, with or without applying a frequency hopping, a hopping pattern, a DMRS configuration (the number of OFDM symbols for front-loaded DMRS, configurations of cyclic shift and time spread, or the like), the number of HARQ processes, information on transformer precoder, and information on a configuration for TPC. The transmission parameters and the start of grant of the data transmission related to the grant free access may be simultaneously configured, or the start of grant of the data transmission in the grant free access may be configured at different timings (in a case of a SCell, SCell activation, and the like) after the transmission parameters for the grant free access are configured. A second type is type 2 configured grant transmission (UL-TWG-type2), in which the base station apparatus transmits transmission parameters for the grant free access to the terminal apparatus through higher layer signaling (e.g., RRC), and transmits start of grant (activation) and end of grant (deactivation (release)) of the data transmission in the grant free access, and change of the transmission parameters using the DCI (L1 signaling). Here, a periodicity of the physical resource in RRC, the number of repetitions, an RV configuration for repetitive transmission, the number of HARQ processes, information on transformer precoder, and information on a configuration for TPC may be included, and the start of grant (activation) on the basis of the DCI may include a physical resource (resource block allocation) that can be used for the grant free access. The transmission parameters and the start of grant of the data transmission related to the grant free access may be simultaneously configured, or the start of grant of the data transmission in the grant free access may be configured at different timings after the transmission parameters for the grant free access are configured. An aspect of the present disclosure may be applied to any grant free access described above.

On the other hand, Semi-Persistent Scheduling (SPS) technology is introduced in LTE, and periodic resource allocation is possible mainly in Voice over Internet Protocol (VoIP) applications. In the SPS, the DCI is used to perform start of grant (activation) by way of an UL Grant including the transmission parameters such as a physical resource designation (resource blocks allocation) and an MCS. Thus, the type (UL-TWG-type 1) performing the start of grant (activation) in the grant free access through higher layer signaling (e.g., RRC) differ from the SPS in the starting procedure. The UL-TWG-type 2 is the same in the point of performing the start of grant (activation) using the DCI (L1 signaling), but may be different in the point of being capable of being used in the SCell, the BWP, and the SUL, or of notifying the number of repetitions, and an RV configuration for repetitive transmission through RRC signaling. The base station apparatus may perform scrambling with different types of RNTI for the DCI (L1 signaling) used for the grant free access (UL-TWG-type 1 and UL-TWG-type 2) and the DCI used for the dynamic scheduling, or may perform scrambling with the same RNTI between the DCI used for the re-transmission control of the UL-TWG-type 1 and the DCI used for the activation and deactivation (release) and the re-transmission control of the UL-TWG-type 2.

The base station apparatus 10 and the terminal apparatuses 20 may support non-orthogonal multiple access in addition to orthogonal multiple access. It's noted that the base station apparatus 10 and the terminal apparatuses 20 can support both the grant free access and the scheduled access (dynamic scheduling). Here, an "uplink scheduled access" refers to data transmission by the terminal apparatus 20 according to the following procedure. The terminal apparatus 20 requests a radio resource for transmitting uplink data to the base station apparatus 10 using the random access procedure (Random Access Procedure) or the SR. The base station apparatus provides an UL Grant to each terminal apparatus based on the RACH or the SR by way of the DCI. In a case that the terminal apparatus receives an UL Grant as the control information from the base station apparatus, the terminal apparatus transmits uplink data using a prescribed radio resource, based on an uplink transmission parameter included in the UL Grant.

The downlink control information for physical channel transmission in the uplink may include a shared field shared between the scheduled access and the grant free access. In this case, in a case that the base station apparatus 10 indicates transmission of the uplink physical channel using the grant free access, the base station apparatus 10 and the terminal apparatus 20 interpret a bit sequence stored in the shared field in accordance with a configuration for the grant free access (e.g., a look-up table defined for the grant free access). Similarly, in a case that the base station apparatus 10 indicates transmission of the uplink physical channel using the scheduled access, the base station apparatus 10 and the terminal apparatus 20 interpret the shared field in accordance with a configuration for the scheduled access. Transmission of the uplink physical channel in the grant free access is referred to as Asynchronous data transmission. It's noted that the transmission of the uplink physical channel in the scheduled is referred to as Synchronous data transmission.

In the grant free access, the terminal apparatus 20 may randomly select a radio resource for transmission of uplink data. For example, the terminal apparatus 20 has been notified, by the base station apparatus 10, of multiple candidates for available radio resources as a resource pool, and randomly selects a radio resource from the resource pool. In the grant free access, the radio resource in which the terminal apparatus 20 transmits the uplink data may be configured in advance by the base station apparatus 10. In this case, the terminal apparatus 20 transmits the uplink data using the radio resource configured in advance without receiving the UL Grant (including a physical resource designation) in the DCI. The radio resource includes multiple uplink multiple access resources (resources to which the uplink data can be mapped). The terminal apparatus 20 transmits the uplink data by using one or more uplink multiple access resources selected from the multiple uplink multiple access resources. It's noted that the radio resource in which the terminal apparatus 20 transmits the uplink data may be predetermined in the communication system including the base station apparatus 10 and the terminal apparatus 20. The radio resource for transmission of the uplink data may be notified to the terminal apparatus 20 by the base station apparatus 10 using a physical broadcast channel (e.g., Physical Broadcast Channel (PBCH)/Radio Resource Control (RRC)/system information (e.g. System Information Block (SIB)/physical downlink control channel (downlink control information, e.g., Physical Downlink Control Channel (PDCCH), Enhanced PDCCH (EPDCCH), MTC PDCCH (MPDCCH), and Narrowband PDCCH (NPDCCH)).

In the grant free access, the uplink multiple access resource includes a multiple access physical resource and a Multi-Access Signature Resource. The multiple access physical resource is a resource including time and frequency. The multiple access physical resource and the multi-access signature resource may be used to identify the uplink physical channel transmitted by each terminal apparatus. The resource blocks are units to which the base station apparatus 10 and the terminal apparatus 20 are capable of mapping the physical channel (e.g., the physical data shared channel or the physical control channel). Each of the resource blocks includes one or more subcarriers (e.g., 12 subcarriers or 16 subcarriers) in a frequency domain.

The multi-access signature resource includes at least one multi-access signature of multiple multi-access signature groups (also referred to as multi-access signature pools). The multi-access signature is information indicating a characteristic (mark or indicator) that distinguishes (identifies) the uplink physical channel transmitted by each terminal apparatus. Examples of the multi-access signature include a spatial multiplexing pattern, a spreading code pattern (a Walsh code, an Orthogonal Cover Code (OCC), a cyclic shift for data spreading, the sparse code, or the like), an interleaved pattern, a demodulation reference signal pattern (a reference signal sequence, the cyclic shift, the OCC, or IFDM)/an identification signal pattern, and transmit power, at least one of which is included in the multi-access signature. In the grant free access, the terminal apparatus 20 transmits the uplink data by using one or more multi-access signatures selected from the multi-access signature pool. The terminal apparatus 20 can notify the base station apparatus 10 of available multi-access signatures. The base station apparatus 10 can notify the terminal apparatus of a multi-access signature used by the terminal apparatus 20 to transmit the uplink data. The base station apparatus 10 can notify the terminal apparatus 20 of an available multi-access signature group by the terminal apparatus 20 to transmit the uplink data. The available multi-access signature group may be notified by using the broadcast channel/RRC/system information/downlink control channel. In this case, the terminal apparatus 20 can transmit the uplink data by using a multi-access signature selected from the notified multi-access signature group.

The terminal apparatus 20 transmits the uplink data by using a multiple access resource. For example, the terminal apparatus 20 can map the uplink data to a multiple access resource including a multi-carrier signature resource including one multiple access physical resource, a spreading code pattern, and the like. The terminal apparatus 20 can allocate the uplink data to a multiple access resource including a multi-carrier signature resource including one multiple access physical resource and an interleaved pattern. The terminal apparatus 20 can also map the uplink data to a multiple access resource including one multiple access physical resource and a multi-access signature resource including a demodulation reference signal pattern/identification signal pattern. The terminal apparatus 20 can also map the uplink data to a multiple access resource including one multiple access physical resource and a multi-access signature resource including a transmit power pattern (e.g., the transmit power for each of the uplink data may be configured to cause a difference in a received power at the base station apparatus 10). In such grant free access, the communication system of the present implementation may allow the uplink data transmitted by the multiple terminal apparatuses 20 to overlap (be superimposed, spatially multiplexed, non-orthogonally multiplexed, collide) with one another and be transmitted in the uplink multiple access physical resource.

The base station apparatus 10 detects, in the grant free access, a signal of the uplink data transmitted by each terminal apparatus. To detect the uplink data signal, the base station apparatus 10 may include Symbol Level Interference Cancellation (SLIC) in which interference is canceled based on a demodulation result for an interference signal, Codeword Level Interference Cancellation (CWIC, also referred to as Sequential Interference Canceler (SIC) or Parallel Interference Canceler (PIC)) in which interference is canceled based on the decoding result for the interference signal, turbo equalization, maximum likelihood detection (MLD, Reduced complexity maximum likelihood detection (R-MLD)) in which transmit signal candidates are searched for the most probable signal, Enhanced Minimum Mean Square Error-Interference Rejection Combining (EMMSE-IRC) in which interference signals are suppressed by linear computation, signal detection based on message passing (Belief propagation (BP), Matched Filter (MF)-BP in which a matched filter is combined with BP, or the like.

Figure 2:
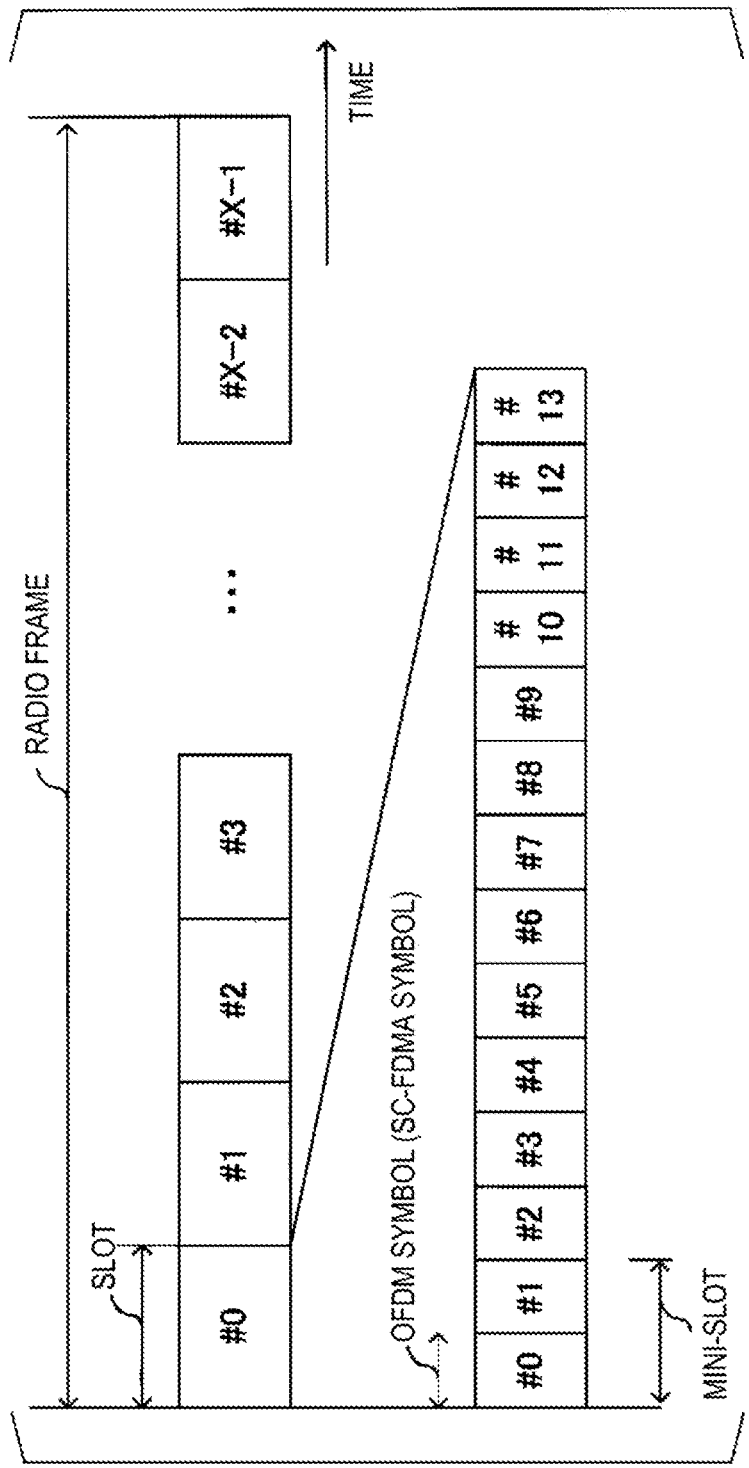
FIG. 2 is a diagram illustrating an example of a radio frame structure for the communication system according to the first implementation.

FIG. 2 is a diagram illustrating an example of a radio frame structure for a communication system according to the present implementation. The radio frame structure indicates a configuration of multiple access physical resources in a time domain. One radio frame includes multiple slots (or may include subframes). FIG. 2 is an example in which one radio frame includes 10 slots. The terminal apparatus 20 has a subcarrier spacing used as a reference (reference numerology). The subframe includes multiple OFDM symbols generated at the subcarrier spacings used as the reference. FIG. 2 is an example in which a subcarrier spacing is 15 kHz, one frame includes 10 slots, one subframe includes one slot, and one slot includes 14 OFDM symbols. In a case that the subcarrier spacing is 15 kHz×2μ (μ is an integer of 0 or more), one frame includes 2μ×10 slots and one subframe includes 2μ slots.

FIG. 2 illustrates a case where the subcarrier spacing used as the reference is the same as a subcarrier spacing used for the uplink data transmission. The communication system according to the present implementation may use slots as minimum units to which the terminal apparatus 20 maps the physical channel (e.g., the physical data shared channel or the physical control channel). In this case, in the multiple access physical resource, one slot is defined as a resource block unit in the time domain. Furthermore, in the communication system according to the present implementation, a minimum unit for mapping the physical channel by the terminal apparatus 20 may be one or multiple OFDM symbols (e.g., 2 to 13 OFDM symbols). The base station apparatus 10 has one or multiple OFDM symbols serving as a resource block unit in the time domain. The base station apparatus 10 may signal a minimum unit for mapping a physical channel to the terminal apparatus 20.

Figure 3:
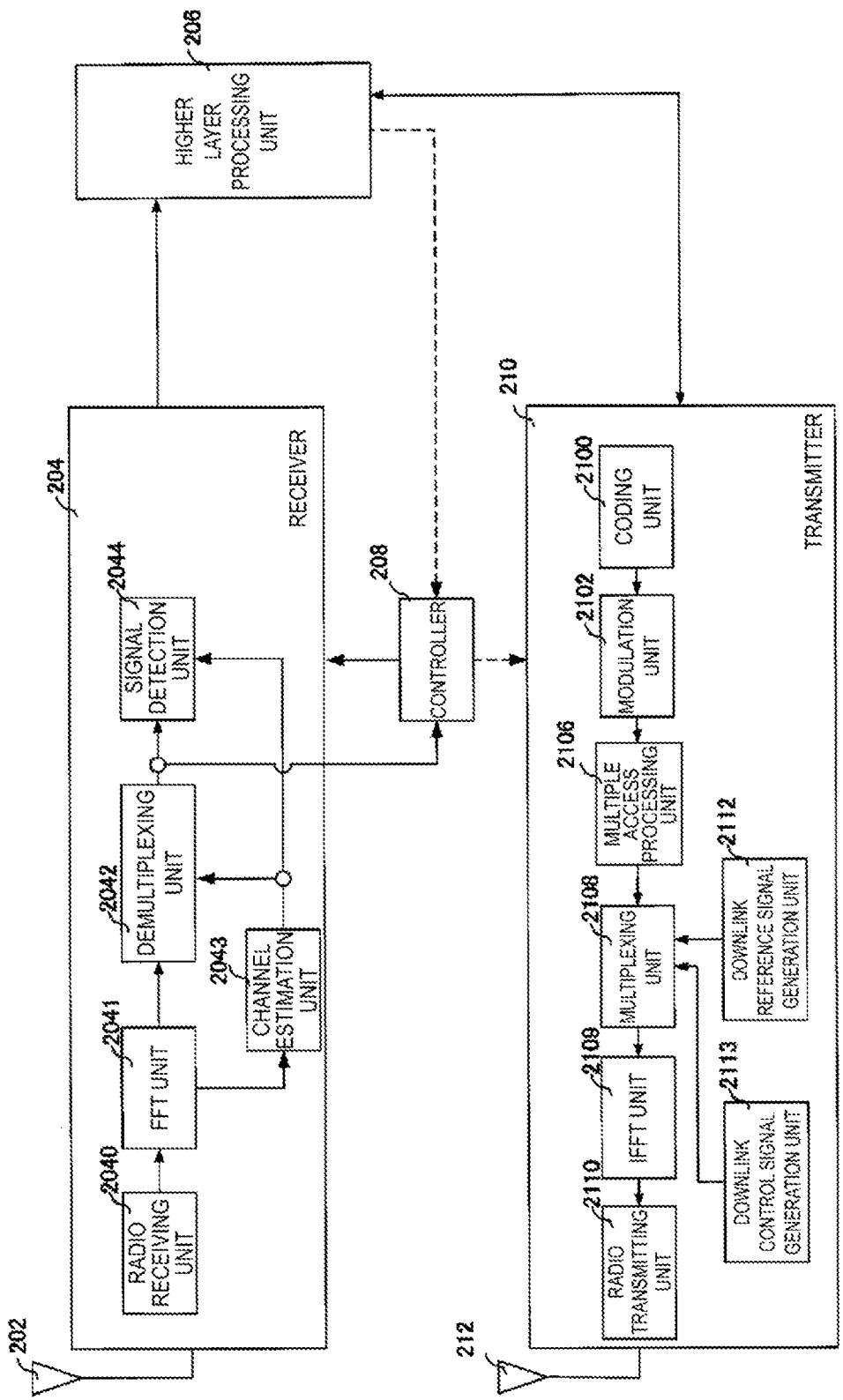
FIG. 3 is a schematic block diagram illustrating a configuration of a base station apparatus 10 according to the first implementation.

FIG. 3 is a schematic block diagram illustrating a configuration of the base station apparatus 10 according to the present implementation. The base station apparatus 10 includes a receive antenna 202, a receiver (receiving step) 204, a higher layer processing unit (higher layer processing step) 206, a controller (control step) 208, a transmitter (transmitting step) 210, and a transmit antenna 212. The receiver 204 includes a radio receiving unit (radio receiving step) 2040, an FFT unit 2041 (FFT step), a demultiplexing unit (demultiplexing step) 2042, a channel estimation unit (channel estimating step) 2043, and a signal detection unit (signal detecting step) 2044. The transmitter 210 includes a coding unit (coding step) 2100, a modulation unit (modulation step) 2102, a multiple access processing unit (multiple access processing step) 2106, a multiplexing unit (multiplexing step) 2108, a radio transmitting unit (radio transmitting step) 2110, an IFFT unit (IFFT step) 2109, a downlink reference signal generation unit (downlink reference signal generation step) 2112, and a downlink control signal generation unit (downlink control signal generation step) 2113.

The receiver 204 demultiplexes, demodulates, and decodes an uplink signal (uplink physical channel, uplink physical signal) received from the terminal apparatus 10 via the receive antenna 202. The receiver 204 outputs a control channel (control information) separated from the received signal to the controller 208. The receiver 204 outputs a decoding result to the higher layer processing unit 206. The receiver 204 acquires the SR and the ACK/NACK and CSI for the downlink data transmission included in the received signal.

The radio receiving unit 2040 converts, by down-conversion, an uplink signal received through the receive antenna 202 into a baseband signal, removes unnecessary frequency components from the baseband signal, controls an amplification level in such a manner as to suitably maintain a signal level, orthogonally demodulates the signal based on an in-phase component and an orthogonal component of the received signal, and converts the resulting orthogonally-demodulated analog signal into a digital signal. The radio receiving unit 2040 removes a portion of the digital signal resulting from the conversion, the portion corresponding to a Cyclic Prefix (CP). The FFT unit 2041 performs a fast Fourier transform on the downlink signal from which CP has been removed (demodulation processing for OFDM modulation), and extracts the signal in the frequency domain.

The channel estimation unit 2043 uses the demodulation reference signal to perform channel estimation for signal detection for the uplink physical channel. The channel estimation unit 2043 receives as inputs, from the controller 208, the resources to which the demodulation reference signal is mapped and the demodulation reference signal sequence allocated to each terminal apparatus. The channel estimation unit 2043 uses the demodulation reference signal sequence to measure the channel state between the base station apparatus 10 and the terminal apparatus 20. The channel estimation unit 2043, in a case of the grant free access, can identify the terminal apparatus by using the result of channel estimation (impulse response and frequency response with the channel state) (the channel estimation unit 2043 is thus also referred to as an identification unit). The channel estimation unit 2043 determines that an uplink physical channel has been transmitted by the terminal apparatus 20 associated with the demodulation reference signal from which the channel state has been successfully extracted. In the resource on which the uplink physical channel is determined by the channel estimation unit 2043 to have been transmitted, the demultiplexing unit 2042 extracts the signal in the frequency domain input from the FFT unit 2041 (the signal includes signals from multiple terminal apparatuses 20).

The demultiplexing unit 2042 separates and extracts the uplink physical channel (physical uplink control channel, physical uplink shared channel) and the like included in the extracted uplink signal in the frequency domain. The demultiplexing unit outputs the physical uplink channel to the signal detection unit 2044/controller 208.

The signal detection unit 2044 uses the channel estimation result estimated by the channel estimation unit 2043 and the signal in the frequency domain input from the demultiplexing unit 2042 to detect a signal of uplink data (uplink physical channel) from each terminal apparatus. The signal detection unit 2044 performs detection processing for a signal from the terminal apparatus 20 associated with the demodulation reference signal (demodulation reference signal from which the channel state has been successfully extracted) allocated to the terminal apparatus 20 determined to have transmitted the uplink data.

Figure 4:
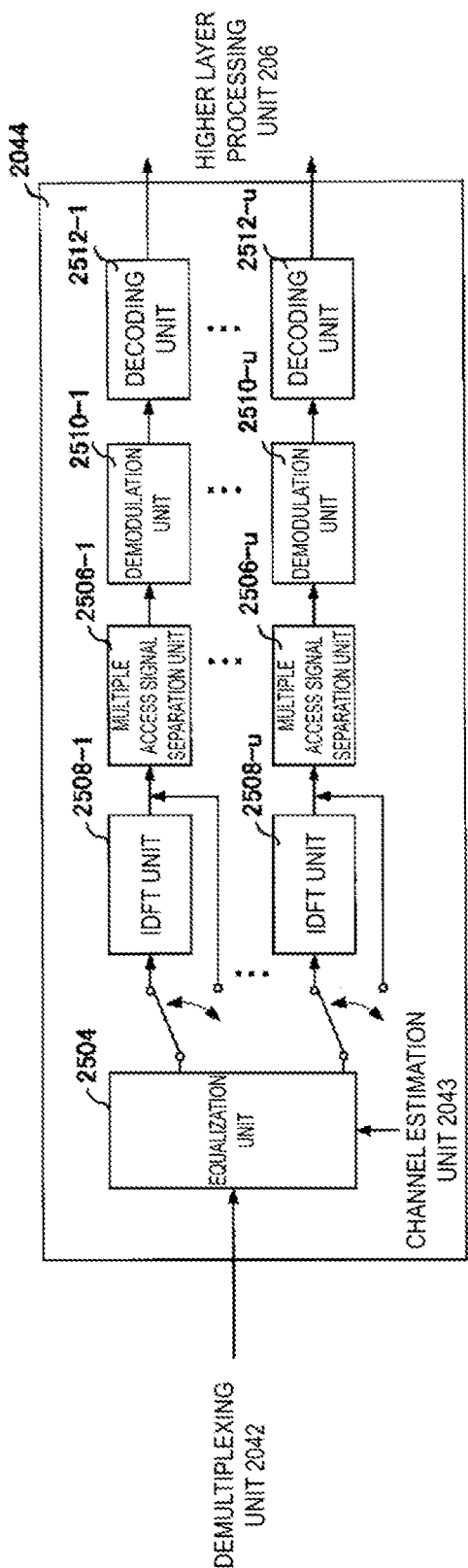
FIG. 4 is a diagram illustrating an example of a signal detection unit according to the first implementation.

FIG. 4 is a diagram illustrating an example of the signal detection unit according to the present implementation. The signal detection unit 2044 includes an equalization unit 2504, multiple access signal separation units 2506-1 to 2506-$u$, IDFT units 2508-1 to 2508-$u$, demodulation units 2510-1 to 2510-$u$, and decoding units 2512-1 to 2512-$u$. u, in the case of the grant free access, represents the number of terminal apparatuses determined by the channel estimation unit 2043 to have transmitted uplink data (for which the channel state has been successfully extracted) on the same multiple access physical resource or overlapping multiple access physical resources (at the same time and at the same frequency). u, in the case of the scheduled access, represents the number of terminal apparatuses allowed to transmit uplink data on the same multiple access physical resource or overlapping multiple access physical resources in the DCI (at the same time, for example, OFDM symbols, slots). Each of the portions constituting the signal detection unit 2044 is controlled using the configuration related to the grant free access for each terminal apparatus and input from the controller 208.

The equalization unit 2504 generates an equalization weight based on the MMSE standard, from the frequency response input from the channel estimation unit 2043. Here, MRC and ZF may be used for the equalization processing. The equalization unit 2504 multiplies the equalization weight by the signal (including a signal of each terminal apparatus) in the frequency domain input from the demultiplexing unit 2042, and extracts the signal in the frequency domain for the terminal apparatus. The equalization unit 2504 outputs the equalized signal in the frequency domain from each terminal apparatus to the IDFT units 2508-1 to 2508-$u$. Here, in a case that data is to be detected that is transmitted by the terminal apparatus 20 and that uses the DFTS-OFDM signal waveform, the signal in the frequency domain is output to the IDFT units 2508-1 to 2508-$u$. In a case that data is to be received that is transmitted by the terminal apparatus 20 and that uses the OFDM signal waveform, the signal in the frequency domain is output to the multiple access signal separation units 2506-1 to 2506-$u$.

Each of the IDFT units 2508-1 to 2508-$u$ converts the equalized signal in the frequency domain from each terminal apparatus into a signal in the time domain. It's noted that the IDFT units 2508-1 to 2508-$u$ correspond to processing performed by the DFT unit of the terminal apparatus 20. Each of the multiple access signal separation units 2506-1 to 2506-$u$ separates the signal multiplexed by the multi-access signature resource from the signal in the time domain from each terminal apparatus after conversion with the IDFT (multiple access signal separation processing). For example, in a case that code spreading is used as a multi-access signature resource, each of the multiple access signal separation units 2506-1 to 2506-$u$ performs inverse spreading processing using the spreading code sequence assigned to each terminal apparatus. It's noted that, in a case that interleaving is applied as a multi-access signature resource, deinterleave processing is performed on the signal in the time domain from each terminal apparatus after conversion with the IDFT (deinterleaving unit).

Each of the demodulation units 2510-1 to 2510-$u$ receives as an input, from the controller 208, pre-notified or predetermined information about the modulation scheme (BPSK, QPSK, 16QAM, 64QAM, 256QAM, and the like) of each terminal apparatus. Based on the information about the modulation scheme, the demodulation units 2510-1 to 2510-$u$ perform demodulation processing on the signal after the multiple access signal separation, and outputs a Log Likelihood Ratio (LLR) of the bit sequence.

The decoding units 2512-1 to 2512-$u$ receive as an input, from the controller 208, pre-notified or predetermined information about the coding rate. The decoding units 2512-1 to 2512-$u$ perform decoding processing on the LLR sequences output from the demodulation units 2510-1 to 2510-$u$, respectively, and output the decoded uplink data/uplink control information to the higher layer processing unit 206. In order to perform cancellation processing such as a Successive Interference Canceller (SIC) or turbo equalization, the decoding units 2512-1 to 2512-$u$ may generate replicas from external LLRs or post LLRs output from the decoding units and perform the cancellation processing. A difference between the external LLR and the post LLR is whether to subtract, from the decoded LLR, the pre LLR input to each of the decoding units 2512-1 to 2512-$u$. In a case that the number of repetitions of SIC or turbo equalization is larger than or equal to a prescribed value, each of the decoding units 2512-1 to 2512-$u$ may perform hard decision on the LLR resulting from the decoding processing, and may output the bit sequence of the uplink data for each terminal apparatus to the higher layer processing unit 206. It's noted that the signal detection is not limited to that using the turbo equalization processing, and can be replaced with signal detection based on replica generation and using no interference cancellation, maximum likelihood detection, EMMSE-IRC, or the like.

The controller 208 controls the receiver 204 and the transmitter 210 by using the configuration information related to the uplink reception/configuration information related to the downlink transmission included in the uplink physical channel (physical uplink control channel, physical uplink shared channel, or the like) (notified from the base station apparatus to the terminal apparatus by way of the DCI, RRC, SIB, and the like). The controller 208 acquires the configuration information related to the uplink reception/configuration information related to the downlink transmission from the higher layer processing unit 206. In a case that the transmitter 210 transmits the physical downlink control channel, the controller 208 generates Downlink Control information (DCI) and outputs the generated information to the transmitter 210. It's noted that some of the functions of the controller 108 can be included in the higher layer processing unit 102. It's noted that the controller 208 may control the transmitter 210 in accordance with the parameter of the CP length added to the data signal.

The higher layer processing unit 206 performs processing of layers higher than the physical layer, such as the Medium Access Control (MAC) layer, the Packet Data Convergence Protocol (PDCP) layer, the Radio Link Control (RLC) layer, and the Radio Resource Control (RRC) layer. The higher layer processing unit 206 generates information needed to control the transmitter 210 and the receiver 204, and outputs the resultant information to the controller 208. The higher layer processing unit 206 outputs downlink data (e.g., the DL-SCH), broadcast information (e.g., the BCH), a hybrid automatic retransmission request (Hybrid Automatic Repeat request) indicator (HARQ indicator), and the like to the transmitter 210. The higher layer processing unit 206 receives information, as an input, from the receiver 204, related to a function of the terminal apparatus (UE capability) supported by the terminal apparatus. For example, the higher layer processing unit 206 receives, through signaling in the RRC layer, information related to the function of the terminal apparatus.

The information related to the function of the terminal apparatus includes information indicating whether the terminal apparatus supports a prescribed function, or information indicating that the terminal apparatus has completed introduction and testing of a prescribed function. The information for indicating whether the prescribed function is supported includes information for indicating whether the introduction and testing of the prescribed function have been completed. In a case that the terminal apparatus supports the prescribed function, the terminal apparatus transmits information (parameters) for indicating whether the prescribed function is supported. In a case that the terminal apparatus does not support the prescribed function, the terminal apparatus may be configured not to transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The information related to the function of the terminal apparatus includes information indicating that the grant free access is supported (information on whether or not each of the UL-TWG-type 1 and the UL-TWG-type 2 is supported). In a case that multiple functions corresponding to the grant free access are provided, the higher layer processing unit 206 can receive information indicating whether the grant free access is supported on a function-by-function basis. The information indicating that the grant free access is supported includes information indicating the multiple access physical resource and multi-access signature resource supported by the terminal apparatus. The information indicating that the grant free access is supported may include a configuration of a lookup table for the configuration of the multiple access physical resource and the multi-access signature resource. The information indicating that the grant free access is supported may include some or all of an antenna port, a capability corresponding to multiple tables indicating a scrambling identity and the number of layers, a capability corresponding to a prescribed number of antenna ports, and a capability corresponding to a prescribed transmission mode. The transmission mode is determined by the number of antenna ports, transmission diversity, the number of layers, and whether support of the grant free access and the like are provided.

The information related to the function of the terminal apparatus includes information indicating that a function related to URLLC is supported. Examples of a DCI format for the uplink dynamic scheduling, the SPS/grant free access, the downlink dynamic scheduling, and the SPS includes a compact DCI format that has the smaller total number of bits of the fields in the DCI format, and the information related to the function of the terminal apparatus may include information indicating that a receiving process on the compact DCI format (blind decoding) is supported. The DCI format is allocated and transmitted in a PDCCH search space, and the number of resources that can be used is determined for each aggregation level. Therefore, as the total number of bits of the fields in the DCI format increases, the coding rate of transmission becomes higher, and as the total number of bits of the fields in the DCI format decreases, the coding rate of transmission becomes lower. Therefore, in a case that high reliability such as that of URLLC is required, it is preferable to use the compact DCI format. It's noted that in LTE or NR, the DCI format is allocated in a predetermined resource element (search space). Therefore, in a case that the number of resource elements (aggregation level) is constant, the DCI format with a larger payload size provides a higher coding rate transmission compared to a DCI format with a smaller payload size, which makes it difficult to satisfy the high reliability.

The information related to the function of the terminal apparatus includes information indicating that a function related to URLLC is supported. For example, information may be included that indicates support of high reliability detection of the PDCCH by repeatedly transmitting the information of the DCI format for the uplink or downlink dynamic scheduling (detection by blind decoding). In a case of repeatedly transmitting the information of the DCI format on the PDCCH, the base station apparatus may repeatedly transmit in a prescribed rule the information of the same DCI format associated with a candidate for blind decoding in a search space to be repeatedly transmitted, an aggregation level, a search space, a CORESET, a BWP, a serving cell, and a slot.

The information related to the function of the terminal apparatus may include information indicating that a function related to carrier aggregation is supported. The information related to the function of the terminal apparatus may include information indicating that the functions related to simultaneous transmission of multiple component carriers (serving cells) (including a case of overlapping in the time domain, overlapping at least in some OFDM symbols) are supported.

The higher layer processing unit 206 manages various types of configuration information about the terminal apparatus. Some of the various types of configuration information are input to the controller 208. The various types of configuration information are transmitted from the base station apparatus 10 via the transmitter 210 using the downlink physical channel. The various types of configuration information include configuration information related to the grant free access input from the transmitter 210. The configuration information related to the grant free access includes configuration information about the multiple access resources (multiple access physical resources and multi-access signature resources). For example, the configuration information related to the grant free access may include a configuration related to the multi-access signature resource (configuration related to processing performed based on a mark for identifying the uplink physical channel transmitted by the terminal apparatus 20), such as an uplink resource block configuration (a starting position of the OFDM symbol to be used, the number of OFDM symbols/the number of resource blocks), a configuration of the demodulation reference signal/identification signal (reference signal sequence, cyclic shift, OFDM symbols to be mapped, and the like), a spreading code configuration (Walsh code, Orthogonal Cover Code (OCC), sparse code, spreading rates of these spreading codes, and the like), an interleave configuration, a transmit power configuration, a transmit and/or receive antenna configuration, and a transmit and/or receive beamforming configuration. These multi-access signature resources may be directly or indirectly associated (linked) with one another. The association of the multi-access signature resources is indicated by a multi-access signature process index. The configuration information related to the grant free access may include the configuration of the look-up table for the configuration of the multiple access physical resource and multi-access signature resource. The configuration information related to the grant free access may include setup of the grant free access, information indicating release, ACK/NACK reception timing information for uplink data signals, retransmission timing information for uplink data signals, and the like.

Based on the configuration information related to the grant free access that is notified as the control information, the higher layer processing unit 206 manages multiple access resources (multiple access physical resources, multi-access signature resources) for the uplink data (transport blocks) in grant-free. Based on the configuration information related to the grant free access, the higher layer processing unit 206 outputs, to the controller 208, information used to control the receiver 204.

The higher layer processing unit 206 outputs generated downlink data (e.g., DL-SCH) to the transmitter 210. The downlink data may include a field storing the UE ID (RNTI). The higher layer processing unit 206 adds the CRC to the downlink data. The CRC parity bits are generated using the downlink data. The CRC parity bits are scrambled with the UE ID (RNTI) allocated to the destination terminal apparatus (the scrambling is also referred to as an exclusive-OR operation, masking, or ciphering). However, as described above, the multiple types of RNTI are provided, which are different depending on the data to be transmitted, and the like.

The higher layer processing unit 206 generates or acquires from a higher node, system information (MIB, SIB) to be broadcasted. The higher layer processing unit 206 outputs, to the transmitter 210, the system information to be broadcasted. The system information to be broadcasted can include information indicating that the base station apparatus 10 supports the grant free access. The higher layer processing unit 206 can include, in the system information, a portion or all of the configuration information related to the grant free access (such as the configuration information related to the multiple access resources such as the multiple access physical resource, the multi-access signature resource). The uplink system control information is mapped to the physical broadcast channel/physical downlink shared channel in the transmitter 210.

The higher layer processing unit 206 generates or acquires from a higher node, and outputs to the transmitter 210, downlink data (transport blocks) to be mapped to the physical downlink shared channel, system information (SIB), an RRC message, a MAC CE, and the like. The higher layer processing unit 206 can include, in this higher layer signaling, some or all of the configuration information related to the grant free access and parameters indicating setup and/or release of the grant free access. The higher layer processing unit 206 may generate a dedicated SIB for notifying the configuration information related to the grant free access.

The higher layer processing unit 206 maps the multiple access resources to the terminal apparatuses 20 supporting the grant free access. The base station apparatus 10 may hold a lookup table of configuration parameters for the multi-access signature resource. The higher layer processing unit 206 allocates each configuration parameter to the terminal apparatuses 20. The higher layer processing unit 206 uses the multi-access signature resource to generate the configuration information related to the grant free access for each terminal apparatus. The higher layer processing unit 206 generates a downlink shared channel including a portion or all of the configuration information related to the grant free access for each terminal apparatus. The higher layer processing unit 206 outputs, to the controller 208/transmitter 210, the configuration information related to the grant free access.

The higher layer processing unit 206 configures a UE ID for each terminal apparatus and notifies the terminal apparatus of the UE ID. As the UE ID, a Cell Radio Network Temporary Identifier (RNTI) can be used. The UE ID is used for the scrambling of the CRC added to the downlink control channel and the downlink shared channel. The UE ID is used for scrambling of the CRC added to the uplink shared channel. The UE ID is used to generate an uplink reference signal sequence. The higher layer processing unit 206 may configure a SPS/grant free access-specific UE ID. The higher layer processing unit 206 may configure the UE ID separately depending on whether or not the terminal apparatus supports the grant free access. For example, in a case that the downlink physical channel is transmitted in the scheduled access and the uplink physical channel is transmitted in the grant free access, the UE ID for the downlink physical channel may be configured separately from the UE ID for the downlink physical channel. The higher layer processing unit 206 outputs the configuration information related to the UE ID to the transmitter 210/controller 208/receiver 204.

The higher layer processing unit 206 determines the coding rate, the modulation scheme (or MCS), the transmit power, and the like for the physical channels (physical downlink shared channel, physical uplink shared channel, and the like). The higher layer processing unit 206 outputs the coding rate/modulation scheme/transmit power to the transmitter 210/controller 208/receiver 204. The higher layer processing unit 206 can include the coding rate/modulation scheme/transmit power in higher layer signaling.

In a case that the downlink data to be transmitted is generated, the transmitter 210 transmits the physical downlink shared channel. In a case that the transmitter 210 is transmitting a resource for data transmission by way of the DL Grant, the transmitter 210 may transmit the physical downlink shared channel using the scheduled access, and transmit the physical downlink shared channel using the SPS in a case that the SPS is activated. The transmitter 210 generates the physical downlink shared channel and the demodulation reference signal/control signal associated with the physical downlink shared channel in accordance with the configuration related to the scheduled access/SPS input from the controller 208.

The coding unit 2100 codes the downlink data input from the higher layer processing unit 206 by using the predetermined coding scheme/coding scheme configured by the controller 208 (the coding includes repetitions). The coding scheme may involve application of convolutional coding, turbo coding, Low Density Parity Check (LDPC) coding, Polar coding, and the like. The LDPC code may be used for data transmission, whereas the Polar code may be used for transmission of the control information. Different error correction coding may be used depending on the downlink channel to be used. Different error correction coding may be used depending on the size of the data or control information to be transmitted. For example, the convolution code may be used in a case that the data size is smaller than a prescribed value, and otherwise the correction coding described above may be used. For the coding described above, in addition to a coding rate of ⅓, a mother code such as a low coding rate of ⅙ or 1/12 may be used. In a case that a coding rate higher than the mother code is used, the coding rate used for data transmission may be achieved by rate matching (puncturing). The modulation unit 2102 modulates coded bits input from the coding unit 2100, in compliance with a modulation scheme notified by way of the downlink control information or a modulation scheme predetermined for each channel, such as BPSK, QPSK, 16QAM, 64QAM, or 256QAM (the modulation scheme may include $\pi/2$ shift BPSK or $\pi/4$ shift QPSK).

The multiple access processing unit 2106 performs signal conversion such that the base station apparatus 10 can achieve signal detection even in a case that multiple data are multiplexed on a sequence output from the modulation unit 2102 in accordance with multi-access signature resource input from the controller 208. In a case that the multi-access signature resource is configured as spreading, multiplication by the spreading code sequence is performed according to the configuration of the spreading code sequence. It's noted that, in a case that interleaving is configured as a multi-access signature resource in the multiple access processing unit 2106, the multiple access processing unit 2106 can be replaced with the interleave unit. The interleave unit performs interleave processing on the sequence output from the modulation unit 2102 in accordance with the configuration of the interleave pattern input from the controller 208. In a case that code spreading and interleaving are configured as a multi-access signature resource, the multiple access processing unit 2106 of the transmitter 210 performs spreading processing and interleaving. A similar operation is performed even in a case that any other multi-access signature resource is applied, and the sparse code or the like may be applied.

In a case that the OFDM signal waveform is used, the multiple access processing unit 2106 inputs the multiple-access-processed signal to the multiplexing unit 2108. The downlink reference signal generation unit 2112 generates a demodulation reference signal in accordance with the configuration information about the demodulation reference signal input from the controller 208. The configuration information about the demodulation reference signal/identification signal is used to generate a sequence acquired according to a rule determined in advance, based on information such as the number of OFDM symbols notified by the base station apparatus by way of the downlink control information, the OFDM symbol position in which the DMRS is allocated, the cyclic shift, and the time domain spreading.

The multiplexing unit 2108 multiplexes (maps, allocates) the downlink physical channel and the downlink reference signal to resource elements for each transmit antenna port. In a case that the SCMA is used, the multiplexing unit 2108 allocates the downlink physical channel to the resource elements in accordance with an SCMA resource pattern input from the controller 208.

The IFFT unit 2109 performs the Inverse Fast Fourier Transform (IFFT) on the multiplexed signal to perform OFDM modulation to generate OFDM symbols. The radio transmitting unit 2110 adds CPs to the OFDM-modulated symbols to generate a baseband digital signal. Furthermore, the radio transmitting unit 2110 converts the baseband digital signal into an analog signal, removes the excess frequency components from the analog signal, converts the signal into a carrier frequency by up-conversion, performs power amplification, and transmits the resultant signal to the terminal apparatus 20 via the transmit antenna 212. The radio transmitting unit 2110 includes a transmit power control function (transmit power controller). The transmit power control follows configuration information about the transmit power input from the controller 208. It's noted that, in a case that FBMC, UF-OFDM, or F-OFDM is applied, filtering is performed on the OFDM symbols in units of subcarriers or sub-bands.

Figure 5:
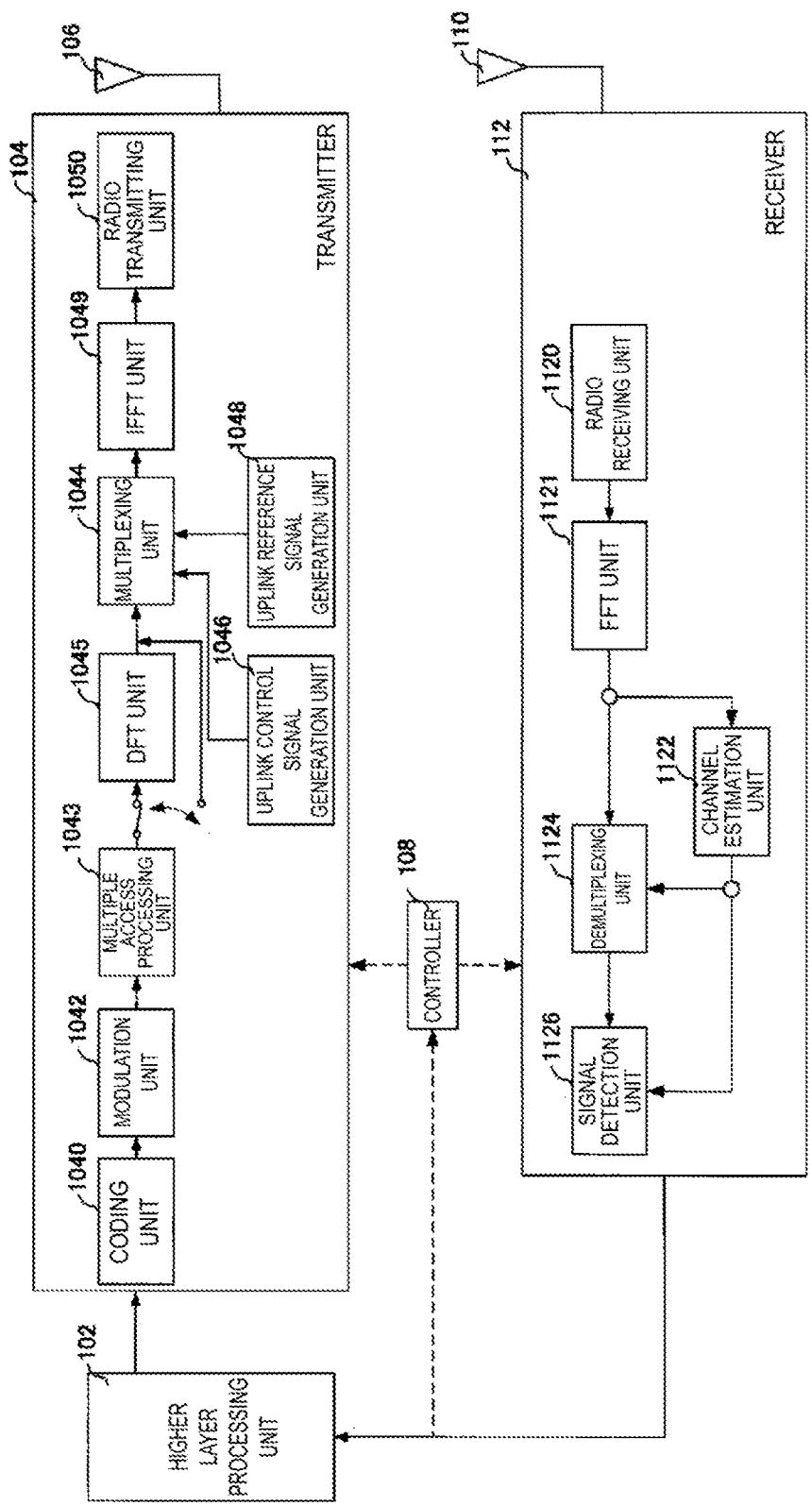
FIG. 5 is a schematic block diagram illustrating a configuration of a terminal apparatus 20 according to the first implementation.

FIG. 5 is a schematic block diagram illustrating a configuration of the terminal apparatus 20 according to the present implementation. The base station apparatus 10 includes a higher layer processing unit (higher layer processing step) 102, a transmitter (transmitting step) 104, a transmit antenna 106, a controller (control step) 108, a receive antenna 110, and a receiver (receiving step) 112. The transmitter 104 includes a coding unit (coding step) 1040, a modulation unit (modulating step) 1042, a multiple access processing unit (multiple access processing step) 1043, a multiplexing unit (multiplexing step) 1044, a DFT unit (DFT step) 1045, an uplink control signal generation unit (uplink control signal generating step) 1046, an uplink reference signal generation unit (uplink reference signal generating step) 1048, an IFFT unit 1049 (IFFT step), and a radio transmitting unit (radio transmitting step) 1050. The receiver 112 includes a radio receiving unit (radio receiving step) 1120, an FFT unit (FFT step) 1121, a channel estimation unit (channel estimating step) 1122, a demultiplexing unit (demultiplexing step) 1124, and a signal detection unit (signal detecting step) 1126.

The higher layer processing unit 102 performs processing of layers higher than the physical layer, such as the Medium Access Control (MAC) layer, the Packet Data Convergence Protocol (PDCP) layer, the Radio Link Control (RLC) layer, and the Radio Resource Control (RRC) layer. The higher layer processing unit 102 generates information needed to control the transmitter 104 and the receiver 112, and outputs the resultant information to the controller 108. The higher layer processing unit 102 outputs, to the transmitter 104, uplink data (e.g., UL-SCH), uplink control information, and the like.

The higher layer processing unit 102 transmits information related to the terminal apparatus, such as the function of the terminal apparatus (UE capability), from the base station apparatus 10 (via the transmitter 104). The information related to the terminal apparatus includes information indicating that reception/detection/blind decoding of the grant free access or the compact DCI is supported, information indicating that reception/detection/blind decoding in the case that the information of the DCI format is repeatedly transmitted on the PDCCH is supported, and information indicating whether such functions are supported on a per function basis. The information indicating that the grant free access is supported and the information indicating whether the grant free access is supported on a per function basis may be identified depending on the transmission mode.

Based on the various types of configuration information input from the higher layer processing unit 102, the controller 108 controls the transmitter 104 and the receiver 112. The controller 108 generates the uplink control information (UCI), based on the configuration information related to the control information input from the higher layer processing unit 102, and outputs the generated information to the transmitter 104.

The transmitter 104 codes and modulates the uplink control information, the uplink shared channel, and the like input from the higher layer processing unit 102 for each terminal apparatus, to generate a physical uplink control channel and a physical uplink shared channel. The coding unit 1040 codes the uplink control information and the uplink shared channel by using the predetermined coding scheme/coding scheme notified by way of the control information (the coding includes repetitions). The coding scheme may involve application of convolutional coding, turbo coding, Low Density Parity Check (LDPC) coding, Polar coding, and the like. The modulation unit 1042 modulates the coded bits input from the coding unit 1040 by using a predetermined modulation scheme/a modulation scheme notified by way of the control information, such as the BPSK, QPSK, 16QAM, 64QAM, or 256QAM.

The multiple access processing unit 1043 performs signal conversion such that the base station apparatus 10 can achieve signal detection even in a case multiple pieces of data are multiplexed on a sequence output from the modulation unit 1042 in accordance with the multi-access signature resource input from the controller 108. In a case that the multi-access signature resource is configured as spreading, multiplication by the spreading code sequence is performed according to the configuration of the spreading code sequence. The configuration of the spreading code sequence may be associated with other configurations of the grant free access such as the demodulation reference signal/identification signal. It's noted that the multiple access processing may be performed on the sequence after the DFT processing. It's noted that, in a case that interleaving is configured as a multi-access signature resource in the multiple access processing unit 1043, the multiple access processing unit 1043 can be replaced with an interleave unit. The interleave unit performs interleave processing on the sequence output from the DFT unit in accordance with the configuration of the interleave pattern input from the controller 108. In a case that code spreading and interleaving are configured as a multi-access signature resource, the multiple access processing unit 1043 of the transmitter 104 performs spreading processing and interleaving. A similar operation is performed even in a case that any other multi-access signature resource is applied, and the sparse code or the like may be applied.

The multiple access processing unit 1043 inputs the multiple-access-processed signal to the DFT unit 1045 or the multiplexing unit 1044 depending on whether a DFTS-OFDM signal waveform or an OFDM signal waveform is used. In a case that the DFTS-OFDM signal waveform is used, the DFT unit 1045 rearranges multiple-access-processed modulation symbols output from the multiple access processing unit 1043 in parallel and then performs Discrete Fourier Transform (DFT) processing on the rearranged modulation symbols. Here, a zero symbol sequence may be added to the modulation symbols, and the DFT may then be performed to provide a signal waveform in which, instead of a CP, a zero interval is used for a time signal resulting from IFFT. A specific sequence such as Gold sequence or a Zadoff-Chu sequence may be added to the modulation symbols, and the DFT may then be performed to provide a signal waveform in which, instead of a CP, a specific pattern is used for the time signal resulting from the IFFT. In a case that the OFDM signal waveform is used, the DFT is not applied, and thus, the multiple-access-processed signal is input to the multiplexing unit 1044. The controller 108 performs control using a configuration of the zero symbol sequence (the number of bits in the symbol sequence and the like) and a configuration of the specific sequence (sequence seed, sequence length, and the like), the configurations being included in the configuration information related to the grant free access.

The uplink control signal generation unit 1046 adds the CRC to the uplink control information input from the controller 108, to generate a physical uplink control channel. The uplink reference signal generation unit 1048 generates an uplink reference signal.

The multiplexing unit 1044 maps each of the modulation symbols of the uplink physical channels modulated by the multiple access processing unit 1043 and the DFT unit 1045, the physical uplink control channel, and the uplink reference signal to the resource elements. The multiplexing unit 1044 maps the physical uplink shared channel and the physical uplink control channel to resources allocated to each terminal apparatus.

The IFFT unit 1049 performs Inverse Fast Fourier Transform (IFFT) on the modulation symbols of each multiplexed uplink physical channel to generate OFDM symbols. The radio transmitting unit 1050 adds cyclic prefixes (CPs) to the OFDM symbols to generate a baseband digital signal. Furthermore, the radio transmitting unit 1050 converts the digital signal into an analog signal, removes excess frequency components from the analog signal by filtering, performs up-conversion to the carrier frequency, performs power amplification, and outputs the resultant signal to the transmit antenna 106 for transmission.

The receiver 112 uses the demodulation reference signal to detect the downlink physical channel transmitted from the base station apparatus 10. The receiver 112 detects the downlink physical channel, based on the configuration information notified by the base station apparatus by way of the control information (such as DCI, RRC, SIB). Here, the receiver 112 performs blind decoding, for the search space included in the PDCCH, on a candidate that is predetermined or notified by way of higher layer control information (RRC signaling). The receiver 112 detects the DCI using the CRC scrambled with the C-RNTI, the CS-RNTI, the INT-RNTI (including those for the downlink and the uplink), and other RNTI, as a result of the blind decoding. The blind decoding may be performed by the signal detection unit 1126 in the receiver 112, or may be performed by a control signal detection unit which is not illustrated in the drawing, but may be provided additionally.

The radio receiving unit 1120 converts, by down-conversion, an uplink signal received through the receive antenna 110 into a baseband signal, removes unnecessary frequency components from the baseband signal, controls the amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1120 removes a part corresponding to the CP from the converted digital signal. The FFT unit 1121 performs Fast Fourier Transform (FFT) on the signal from which the CPs have been removed, and extracts a signal in the frequency domain.

The channel estimation unit 1122 uses the demodulation reference signal to perform channel estimation for signal detection for the downlink physical channel. The channel estimation unit 1122 receives as inputs, from the controller 108, the resources to which the demodulation reference signal is mapped and the demodulation reference signal sequence allocated to each terminal apparatus. The channel estimation unit 1122 uses the demodulation reference signal sequence to measure the channel state between the base station apparatus 10 and the terminal apparatus 20. The demultiplexing unit 1124 extracts the signal in the frequency domain input from the radio receiving unit 1120 (the signal includes signals from multiple terminal apparatuses 20). The signal detection unit 1126 uses the channel estimation result and the signal in the frequency domain input from the demultiplexing unit 1124 to detect a signal of downlink data (uplink physical channel).

The higher layer processing unit 102 acquires the downlink data (bit sequence resulting from hard decision) from the signal detection unit 1126. The higher layer processing unit 102 performs descrambling (exclusive-OR operation) on the CRC included in the decoded downlink data for each terminal apparatus, by using the UE ID (RNTI) allocated to each terminal. In a case that no error is found in the downlink data as a result of the descrambling error detection, the higher layer processing unit 102 determines that the downlink data has been correctly received. It's noted that the signal detection unit 1126 may include a control information detection unit detecting control information such as downlink control information, for example, a DCI format.

Figure 6:
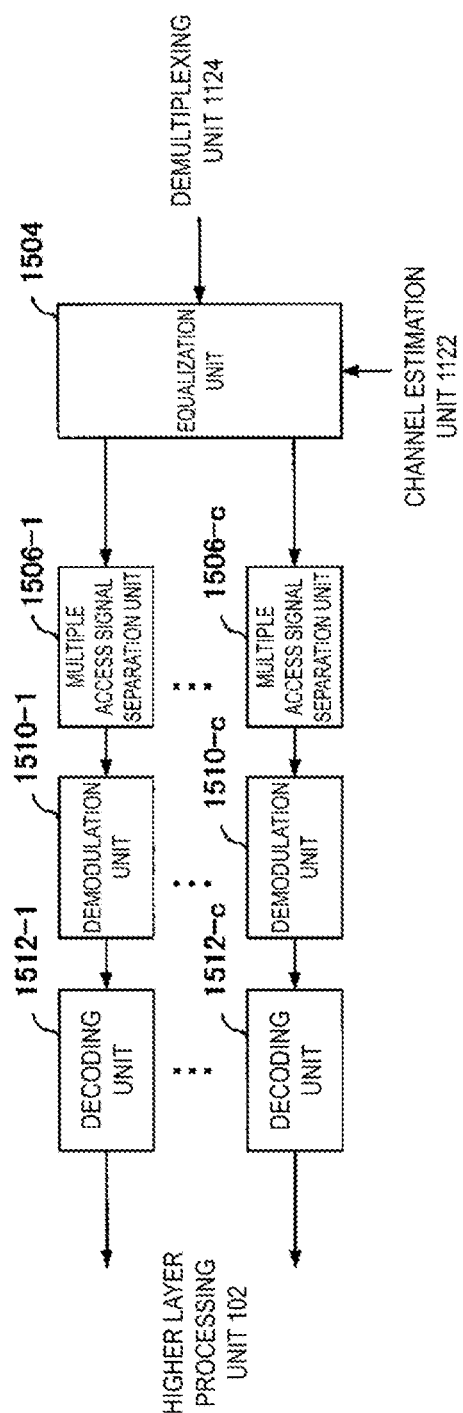
FIG. 6 is a diagram illustrating an example of the signal detection unit according to the first implementation.

FIG. 6 is a diagram illustrating an example of the signal detection unit according to the present implementation. The signal detection unit 1126 includes an equalization unit 1504, multiple access signal separation units 1506-1 to 1506-*c*, demodulation units 1510-1 to 1510-*c*, and decoding units 1512-1 to 1512-*c*.

The equalization unit 1504 generates equalization weights, based on the MMSE standard, from the frequency response input from the channel estimation unit 1122. Here, MRC and ZF may be used for the equalization processing. The equalization unit 1504 multiplies the equalization weights by the signal in the frequency domain input from the demultiplexing unit 1124, and extracts the signal in the frequency domain. The equalization unit 1504 outputs the equalized signal in the frequency domain to the multiple access signal separation units 1506-1 to 1506-*c*. *c* represents a numeral of 1 or greater, and represents the number of signals received in the same subframe, the same slot, or the same OFDM symbols, such as PUSCH and PUCCH. Reception of other downlink channels may be reception at the same timing.

Each of the multiple access signal separation units 1506-1 to 1506-*c* separates the signal multiplexed by the multi-access signature resource from the signal in the time domain (multiple access signal separation processing). For example, in a case that code spreading is used as a multi-access signature resource, each of the multiple access signal separation units 1506-1 to 1506-*c* performs inverse spreading processing using the used spreading code sequence. It's noted that, in a case that interleaving is applied as a multi-access signature resource, deinterleave processing is performed on the signal in the time domain (deinterleaving unit).

The demodulation units 1510-1 to 1510-*c* receive as an input, from the controller 108, pre-notified or predetermined information about the modulation scheme. Based on the information about the modulation scheme, the demodulation units 1510-1 to 1510-*c* perform demodulation processing on the signal after the multiple access signal, and outputs a Log Likelihood Ratio (LLR) of the bit sequence.

The decoding units 1512-1 to 1512-*c* receive as an input, from the controller 108, pre-notified or predetermined information about the coding rate. The decoding units 1512-1 to 1512-*c* perform decoding processing on the LLR sequences output from the demodulation units 1510-1 to 1510-*c*. In order to perform cancellation processing such as a Successive Interference Canceller (SIC) or turbo equalization, the decoding units 1512-1 to 1512-*c* may generate replicas from external LLRs or post LLRs output from the decoding units and perform the cancellation processing. A difference between the external LLR and the post LLR is whether to subtract, from the decoded LLR, the pre LLR input to each of the decoding units 1512-1 to 1512-*c*.

Figure 7:
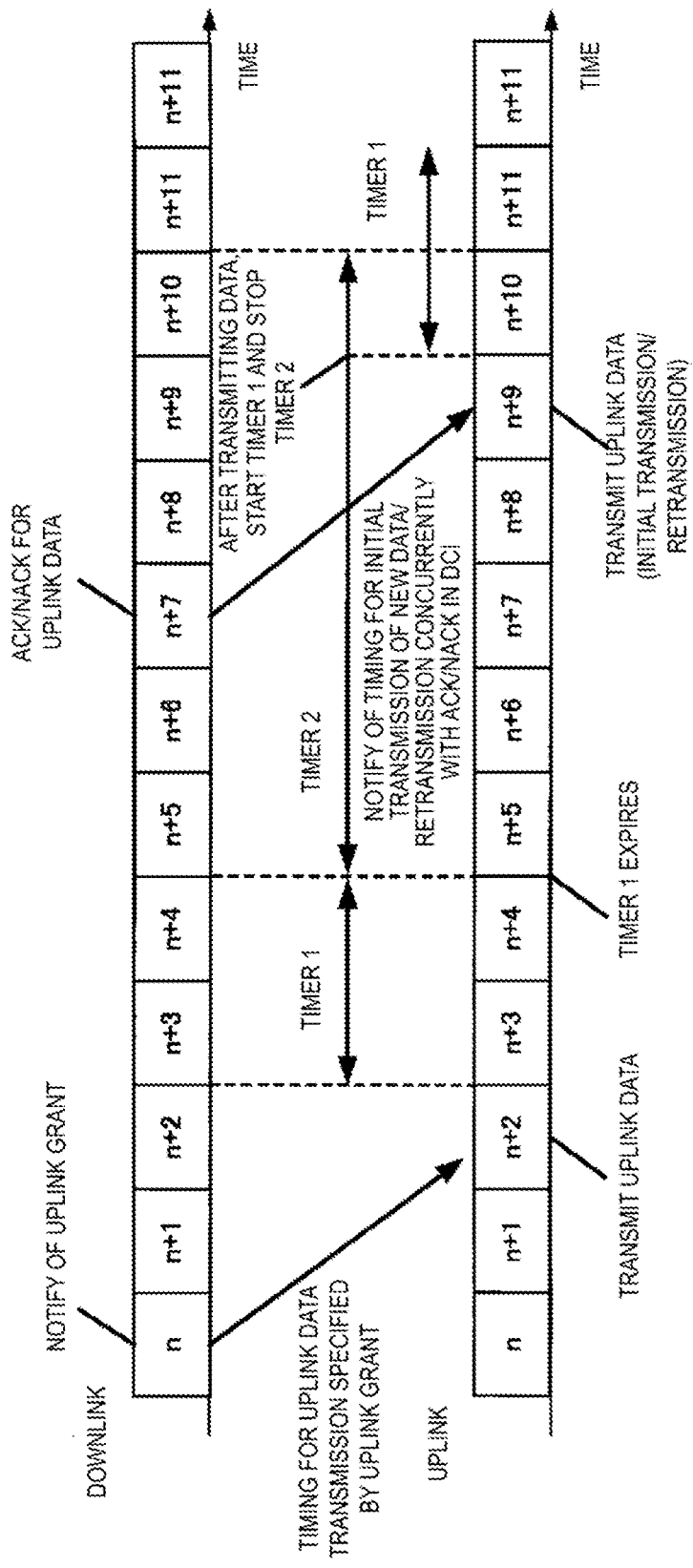
FIG. 7 is a diagram illustrating an example of a known uplink data transmission.

FIG. 7 illustrates an example of a known uplink data transmission. The figure illustrates operations of a timer 1 and a timer 2 that are controlled with respect to uplink data transmission and a notification of an ACK/NACK for the uplink data transmission. A horizontal axis in the figure represents a time and may be a slot/mini slot (Non-Slot or less than 14 multiple OFDM symbols)/OFDM symbol, and is described herein as a slot. First, the base station apparatus notifies the uplink grant in a slot n using the DCI format on the PDCCH. The uplink grant is notified using DCI format 0_0 or 0_1 or is notified using another DCI format. The uplink grant may include information of the frequency resource (resource block, resource block group, subcarrier) used by the terminal apparatus for uplink data transmission, and a relative time from the slot n to an uplink data transmission timing (e.g. in a case that the relative time is k, the slot n+k is the uplink data transmission timing), the number of OFDM symbols and a starting position of the OFDM symbol to be used in the slot at the uplink data transmission timing, and the number of continuous OFDM symbols. The uplink grant may notify the data transmission in multiple slots, and in a case that the relative time indicating the uplink data transmission timing is k, in a case that the data transmission is allowed from the slot n+k to the slot n+k+n', the uplink grant includes information of n'.

In a case of detecting the uplink grant by the blind decoding of the PDCCH, the terminal apparatus transmits the uplink data at the uplink data transmission timing specified by the uplink grant (that is n+2 in the example of FIG. 7, and the relative time k to the data transmission timing is k=2). Here, the uplink grant includes the HARQ process number (e.g., four bits), and the terminal apparatus performs the data transmission based on the uplink grant corresponding to the HARQ process number specified by the uplink grant.

Immediately after the data transmission corresponding to the HARQ process (PUSCH transmission), the timer 1 for the corresponding HARQ process is started (invoked/ran). The timer 1 may be drx-HARQ-RTT-TimerUL, and the drx-HARQ-RTT-TimerUL may be the minimum period before the uplink HARQ retransmission grant (UL HARQ retransmission grant) is expected by the MAC entity. In other words, a period during the timer 1 being running, in which the base station apparatus performs demodulation/decoding processing on the uplink data, refers to a period in which there is no ACK/NACK for the uplink data transmission. Thus, the blind decoding may be stopped during a period in which the blind decoding may be stopped (a period not during an On period) according to the configuration of the DRX and a period during the timer 1 being running. The timer 1 may be configured in a range from 0 to 56 OFDM symbols.

In a case that a period of the timer 1 is set to two slots, the timer 1 expires at the slot n+4. In a case that timer 1 expires, the timer 2 for the corresponding HARQ process is started. The timer 2 may be drx-RetransmissionTimerUL, and drx-RetransmissionTimerUL may be the maximum period until a grant for uplink retransmission is received. FIG. 7 illustrates an example in which the timer 2 is set to six slots. The timer 2 may be set to any among 10 slots, 11 slots, 12 slots, 14 slots, 16 slots, 18 slots, 116 slots, 124 slots, 133 slots, 140 slots, 164 slots, 180 slots, 196 slots, 1112 slots, 1128 slots, and 1160 slots.

In a case that the terminal apparatus receives an ACK/NACK for the uplink data transmission during the timer 2 being running (in a slot n+7 in the example of FIG. 7), immediately after new data transmission (initial transmission) for the ACK or the same data transmission (retransmission) as the previous transmission for the NACK, the terminal apparatus starts the timer 1 for the corresponding HARQ process and stops the timer 2 for the corresponding HARQ process. Here, the ACK/NACK for the uplink data transmission can be used in the same format as the DCI format used in the uplink grant, and is notified by the HARQ process ID and the NDI in the DCI format. Specifically, in a case that the DCI format including the HARQ process ID for the data transmission is detected, a case that a value of the NDI is changed from the NDI value at the time when the previous DCI format including the same HARQ process ID is detected (a case of being toggled in one bit) corresponds to an ACK and the detected DCI format is an uplink grant for new data transmission, and a case that a value of the NDI is the same (a case of not being toggled) corresponds to a NACK and the detected DCI format is an uplink grant for retransmission data transmission.

On the other hand, in a case that the ACK/NACK for the uplink data transmission cannot be detected or the initial transmission or retransmission based on the DCI format including the ACK/NACK is not completed until the timer 2 expires, the terminal apparatus may stop the blind decoding in the period during which the blind decoding may be performed (a period not during an On period) according to the configuration of the DRX. In this case, after the period (a period during an On period) during which the decoding determined by the period of the DRX is required is reached, the blind decoding may be started to again wait for the ACK/NACK for the uplink data transmission. In a case that the ACK/NACK for the uplink data transmission cannot be detected even in a case that the timer 2 expires, the detection of the ACK/NACK transmitted by the base station apparatus is considered to be failed, and a buffer of the corresponding HARQ process ID may be flushed or retransmission may be performed on a predetermined radio resource (which may be a radio resource configured in RRC and activated by the SPS).

Figure 8:
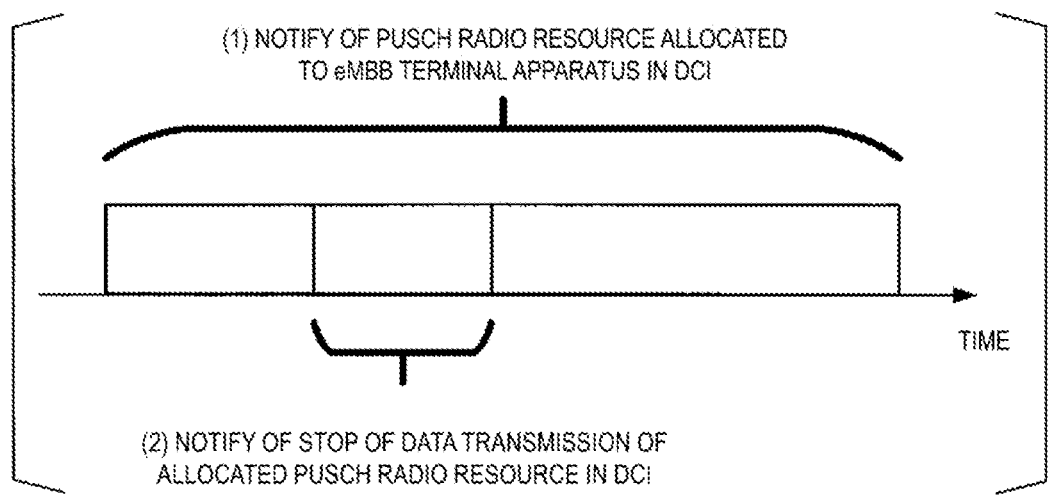
FIG. 8 is a diagram illustrating an example of a stop of uplink data transmission according to the first implementation.

FIG. 8 illustrates an example of a stop of uplink data transmission according to the first implementation. In the figure, the base station apparatus accommodates multiple terminal apparatuses, that include a terminal apparatus to transmit data requiring at least one of low latency and high reliability (hereinafter referred to as a URLLC terminal apparatus) and a terminal apparatus to transmit data relatively not requiring low latency or high reliability (hereinafter referred to as a non-URLLC terminal apparatus or an eMBB terminal apparatus). First, the eMBB terminal apparatus performing eMBB data transmission detects an uplink grant in the DCI format transmitted on the PDCCH, and receives a notification of an allocated PUSCH radio resource. In a case that the eMBB terminal apparatus detects the DCI format with CRC scrambled with an INT-RNTI/UL-INT-RNTI, information on the radio resource indicated in the DCI format with the CRC scrambled with the INT-RNTI/UL-INT-RNTI includes information on a radio resource that is unavailable to the eMBB terminal apparatus for uplink data transmission, for example, that is used by another terminal apparatus (URLLC terminal apparatus). The eMBB terminal apparatus may cancel/pre-empt/suspend/stop/drop/defer/break/revoke (hereinafter referred to as cancel or pre-empt) the data transmission using the allocated PUSCH radio resource in a case that the allocated PUSCH radio resource at least partially overlaps the unavailable radio resource, or a frequency (subcarrier/resource block) of the allocated PUSCH radio resource is adjacent to a frequency of the unavailable radio resource, or a bandwidth (guard band) between the frequency of the allocated PUSCH radio resource and the frequency of the unavailable radio resource is equal to or less than a prescribed bandwidth or a bandwidth notified through higher layer signaling such as RRC.

Figure 9:
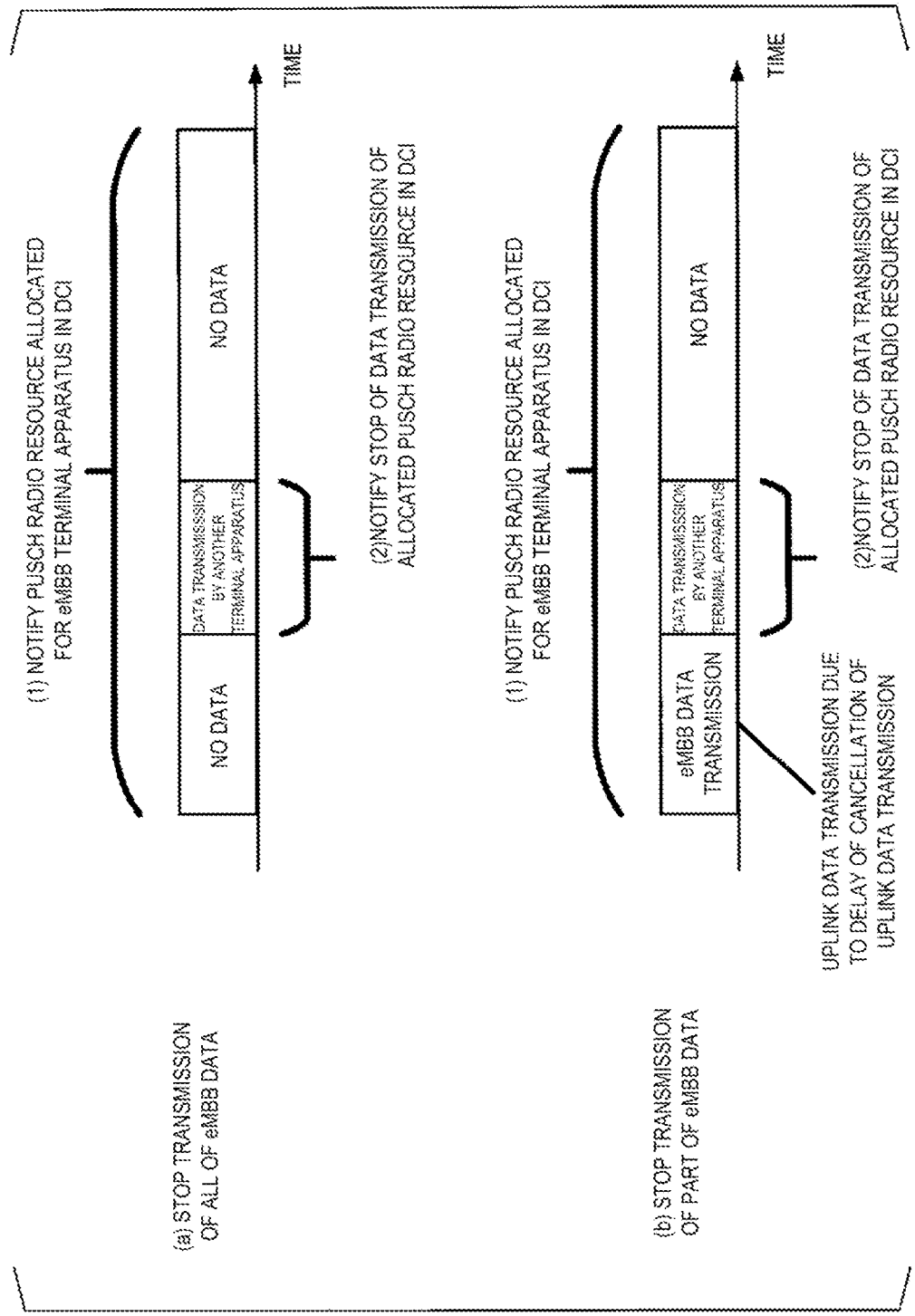
FIG. 9 is a diagram illustrating an example of a stop of uplink data transmission according to the first implementation.

FIG. 9 illustrates an example of the stop of the uplink data transmission according to the first implementation. (a) of FIG. 9 illustrates a case that the eMBB terminal apparatus canceling the allocated PUSCH radio resource causes all of the allocated PUSCH radio resources to be cancelled. This enables processing in (a) of FIG. 9 in a case that a process of stopping data transmission of the allocated PUSCH radio resource is ready in time from when the eMBB terminal apparatus receives the notification of the unavailable radio resource. On the other hand, in (b) of FIG. 9, in a case that the process of stopping the data transmission of the allocated PUSCH radio resource is not ready in time from when the eMBB terminal apparatus receives the notification of the unavailable radio resource, for example, in a case that the notification of the unavailable radio resource is detected in the OFDM symbol (one or more OFDM symbols) at the beginning of the same slot as for the eMBB data transmission, the eMBB terminal apparatus stops the data transmission before the OFDM symbol for the unavailable radio resource. (b) of FIG. 9 illustrates the case that the data transmission is continued until immediately before the OFDM symbol for the radio resource that is unavailable to the eMBB terminal apparatus, but the data transmission may be stopped before the number of OFDM symbols of the OFDM symbols for the unavailable radio resource. It's noted that an aspect of the present disclosure can be applied to both cases. In a case that the eMBB terminal apparatus may continue the data transmission even after the OFDM symbols for the unavailable radio resources only in a case that a prescribed condition is satisfied. Specifically, the prescribed condition includes a case that the coding rate is 1 or less in a case that the OFDM symbol for the unavailable radio resource is considered to be a puncture, or at least one or a combination of two or more of a case that the transmission of the DMRS is possible even in a case of excluding the OFDM symbol for the radio resource, a case of retransmission data transmission, and a case of a Piggyback (UCI on PUSCH).

The difference between the eMBB terminal apparatus and the URLLC terminal apparatus may include a difference between a case that the uplink grant is received using DCI format 0_0/0_1 and a case that the uplink grant is received using the compact DCI having the number of control information bits less than DCI format 0_0/0_1, a difference between a case of using a table low in a minimum spectral efficiency of an MCS table used for the data transmission and a case of using a table high in the minimum spectral efficiency, a difference between a case the number of entries of the MCS table used for the data transmission is 32 (5 bits) and a case of 16 or less (4 bits or less), a difference between a case of dynamic scheduling and a case of SPS/Configured grant/grant free access, a difference between a case that the number of HARQ processes is 16 and a case that the number of HARQ processes is 4, a difference between a case that the number of repetitive data transmissions is equal to or less than a prescribed value (e.g., equal to or less than 1) and a case that the number of repetitive transmissions is more than the prescribed value, a difference between a case that a priority of a Logical CHannel (LCH) is low and a case that the priority is high, or a difference depending on a QoS Class Indicator (QCI).

Figure 10:
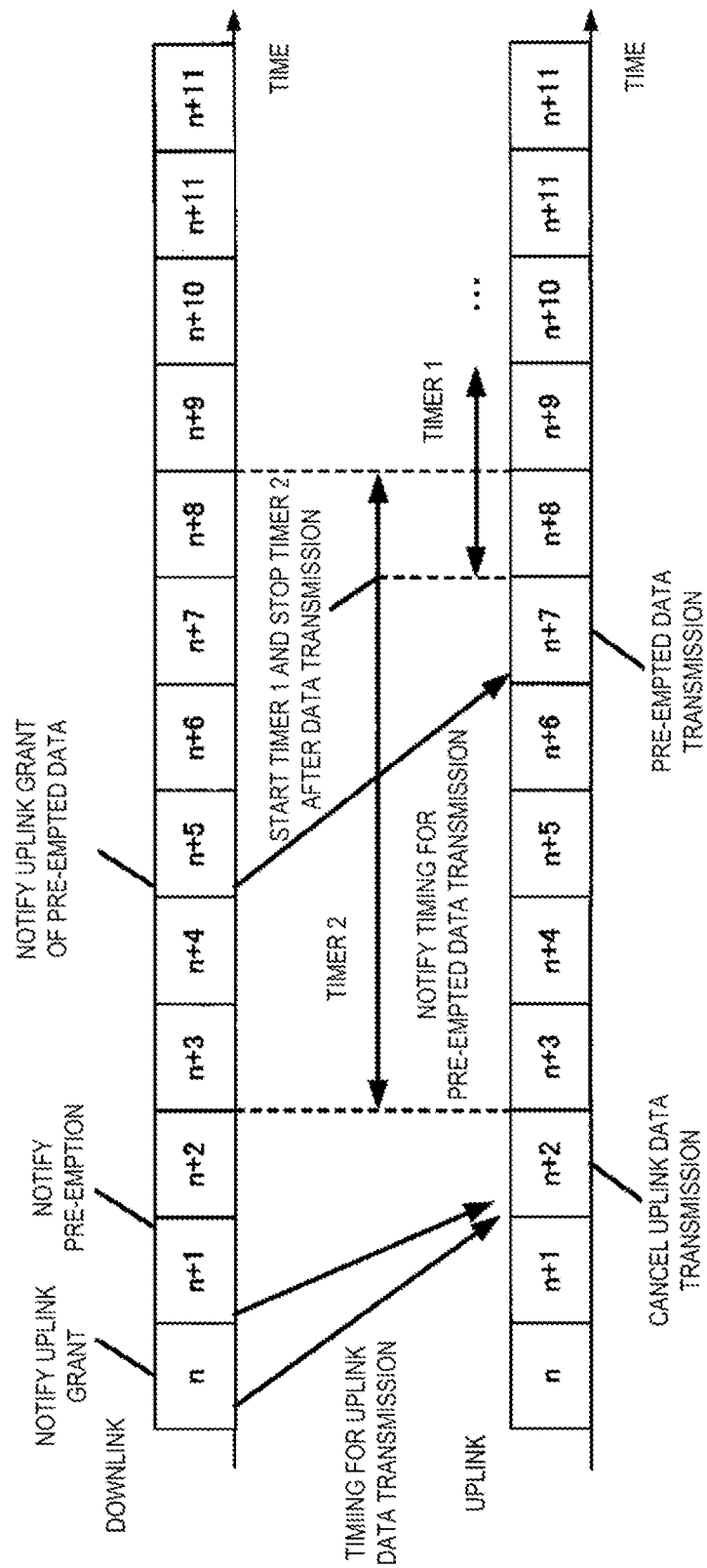
FIG. 10 is a diagram illustrating an example of an uplink data transmission according to the first implementation.

FIG. 10 illustrates an example of the uplink data transmission according to the first implementation. The figure illustrates a timer that is controlled in a case that uplink data transmission is allocated based on the uplink grant, and thereafter, the DCI for pre-emption is received, and then, the uplink data transmission is cancelled. A horizontal axis in the figure represents a time and may be a slot/mini slot (Non-Slot or less than 14 multiple OFDM symbols)/OFDM symbol, and is described as a slot. First, the base station apparatus notifies the uplink grant in a slot n using the DCI format on the PDCCH. The uplink grant is notified using DCI format 0_0 or 0_1 or is notified using another DCI format. The uplink grant may include information of the frequency resource (resource block, resource block group, subcarrier) used by the terminal apparatus for uplink data transmission, and a relative time from the slot n to an uplink data transmission timing (e.g. in a case that the relative time is k, the slot n+k is the uplink data transmission timing), the number of OFDM symbols and a starting position of the OFDM symbol to be used in the slot at the uplink data transmission timing, and the number of continuous OFDM symbols. The uplink grant may notify the data transmission in multiple slots, and in a case that the relative time indicating the uplink data transmission timing is k, in a case that the data transmission is allowed from the slot n+k to the slot n+k+n', the uplink grant includes information of n'.

In a case of detecting the uplink grant by the blind decoding of the PDCCH, the terminal apparatus transmits the uplink data at the uplink data transmission timing specified by the uplink grant (that is n+2 in the example of FIG. 10, and the relative time k to the data transmission timing is k=2), but cancels the uplink data transmission in the slot n+2 in a case of detecting the notification of the pre-emption on the PDCCH using the DCI format in the slot n+1. It's noted that the uplink grant includes the HARQ process number (e.g., four bits), and the terminal apparatus cancels the data transmission based on the uplink grant corresponding to the HARQ process number specified by the uplink grant.

Immediately after the timing for the corresponding data transmission cancelled (PUSCH transmission), in a case that the timer 2 for the corresponding HARQ process is not running, the timer 2 for the corresponding HARQ process is started (invoked/ran/started). The timer 2 may be drx-RetransmissionTimerUL, and drx-RetransmissionTimerUL may be the maximum period until a grant for uplink retransmission is received. FIG. 10 illustrates an example in which the timer 2 is set to six slots. The timer 2 may be set to any among 10 slots, 11 slots, 12 slots, 14 slots, 16 slots, 18 slots, 116 slots, 124 slots, 133 slots, 140 slots, 164 slots, 180 slots, 196 slots, 1112 slots, 1128 slots, and 1160 slots, or may be set to any among the numbers of slots which are not pre-empted and different (from the operation in FIG. 7). The period of the timer 2 may be set for each of the case that the uplink data transmission is canceled based on the pre-emption (FIG. 10) and the case that the uplink data transmission is transmitted (FIG. 7). For example, 16 slots may be set in the case that the uplink data is transmitted, and 10 slots may be set in the case that the uplink data transmission is canceled.

In a case that the terminal apparatus receives the uplink grant for the corresponding data transmission cancelled (pre-empted data) during the timer 2 being running (in the slot n+5 in the example of FIG. 10), the terminal apparatus, immediately after transmitting the data corresponding to the cancelled HARQ process ID, starts the timer 1 for the corresponding HARQ process and stops the timer 2 for the corresponding HARQ process. Here, the HARQ process ID for the uplink data transmission is notified using the DCI format used for the uplink grant. The timer 1 may be drx-HARQ-RTT-TimerUL, and the drx-HARQ-RTT-TimerUL may be the minimum period before the uplink HARQ retransmission grant (UL HARQ retransmission grant) is expected by the MAC entity. In other words, a period during the timer 1 being running, in which the base station apparatus performs demodulation/decoding processing on the uplink data, refers to a period in which there is no ACK/NACK for the uplink data transmission. Thus, the blind decoding may be stopped during a period in which the blind decoding may be stopped (a period not during an On period) according to the configuration of the DRX and a period during the timer 1 running. The timer 1 may be configured in a range from 0 to 56 OFDM symbols. Accordingly, in a case that the uplink data transmission in FIG. 10 is canceled, the base station apparatus does not need to demodulate/decode the uplink data, and thus, the timer 2 is invoked (ran) without using the timer 1.

Figure 11:
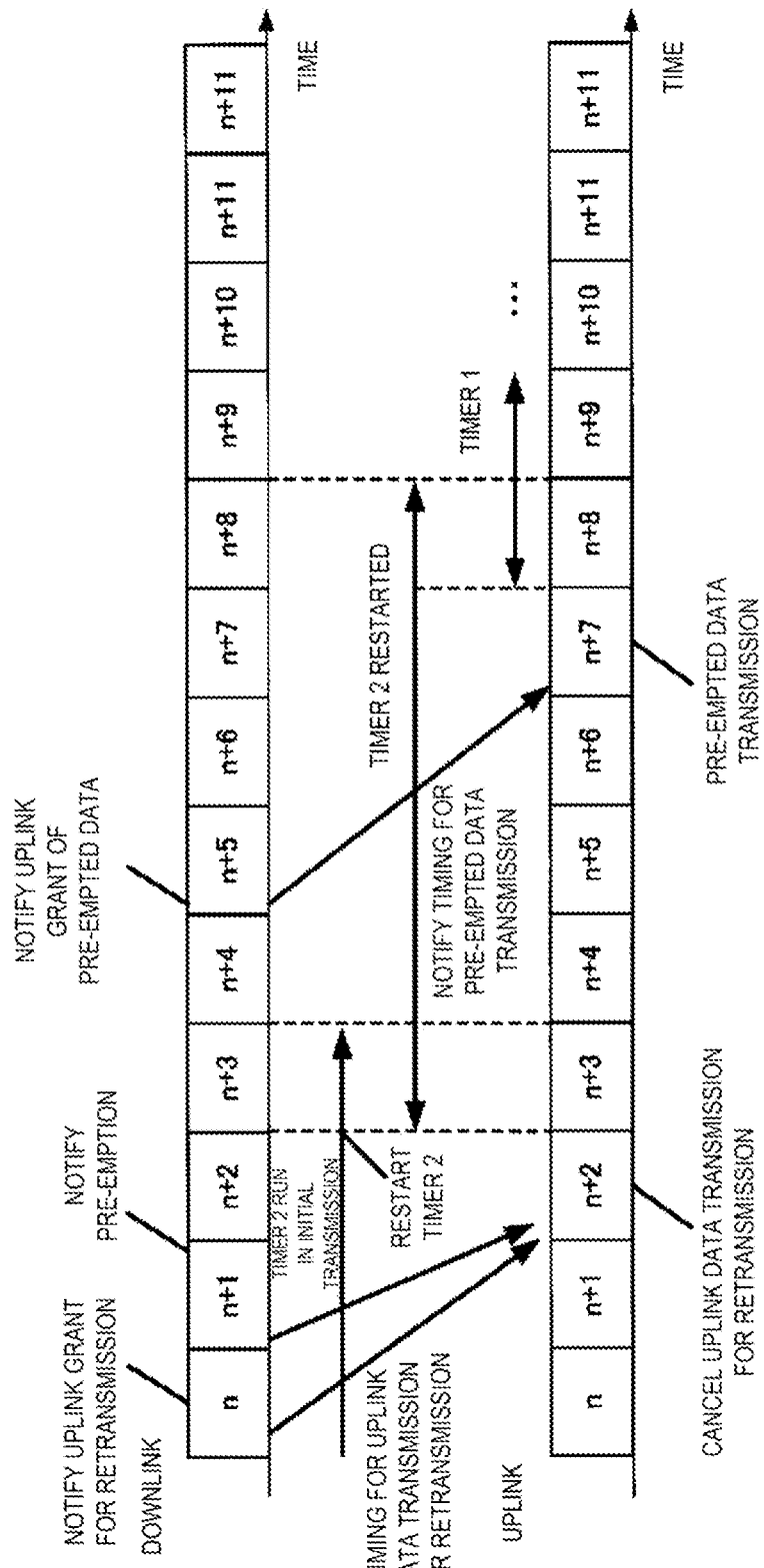
FIG. 11 is a diagram illustrating an example of an uplink data retransmission according to the first implementation.

FIG. 11 illustrates an example of uplink data retransmission according to the first implementation. The figure differs from FIG. 10 in that the cancelled uplink data is retransmission. The initial transmission may be performed in the case that the timer 1 expires and the timer 2 is running in the example of FIG. 7, or in the case that the timer 2 is running in the example of FIG. 10. It's noted that in a case that the uplink data transmission in FIG. 10 is canceled, retransmission (the NDI is not toggled) may be performed, or the initial transmission (NDI is toggled) may be performed, to either of which aspect of the present disclosure can be applied.

In FIG. 11, in a case that the timer 2 is running in the slot n owing to the initial transmission or the retransmission and the cancellation of the uplink data transmission, the base station apparatus notifies the uplink grant for retransmission on the PDCCH using the DCI format. The uplink grant is notified using DCI format 0_0 or 0_1 or is notified using another DCI format. The uplink grant may include information of the frequency resource (resource block, resource block group, subcarrier) used by the terminal apparatus for uplink data transmission, and a relative time from the slot n to an uplink data transmission timing (e.g. in a case that the relative time is k, the slot n+k is the uplink data transmission timing), the number of OFDM symbols and a starting position of the OFDM symbol to be used in the slot at the uplink data transmission timing, and the number of continuous OFDM symbols. The uplink grant may notify the data transmission in multiple slots, and in a case that the relative time indicating the uplink data transmission timing is k, in a case that the data transmission is allowed from the slot n+k to the slot n+k+n', the uplink grant includes information of n'.

In a case of detecting the uplink grant for retransmission by the blind decoding of the PDCCH, the terminal apparatus transmits the uplink data at the uplink data transmission timing specified by the uplink grant (that is n+2 in the example of FIG. 11, and the relative time k to the data transmission timing is k=2), but cancels the uplink data transmission in the slot n+2 in a case of detecting the notification of the pre-emption on the PDCCH using the DCI format in the slot n+1. It's noted that the uplink grant includes the HARQ process number (e.g., four bits), and the terminal apparatus cancels the data transmission based on the uplink grant corresponding to the HARQ process number specified by the uplink grant.

Immediately after the timing for the corresponding data transmission cancelled (PUSCH transmission), in a case that the timer 2 for the corresponding HARQ process is running, the timer 2 for the corresponding HARQ process is started (restarted). The timer 2 may be drx-RetransmissionTimerUL, and drx-RetransmissionTimerUL may be the maximum period until a grant for uplink retransmission is received. FIG. 11 illustrates an example in which the timer 2 is set to six slots. The timer 2 may be set to any among 10 slots, 11 slots, 12 slots, 14 slots, 16 slots, 18 slots, 116 slots, 124 slots, 133 slots, 140 slots, 164 slots, 180 slots, 196 slots, 1112 slots, 1128 slots, and 1160 slots, or may be set to any among the numbers of slots which are not pre-empted and different (from the operation in FIG. 7). The period of the timer 2 may be set for each of the case that the uplink data transmission is canceled based on the pre-emption (FIG. 11) and the case that the uplink data transmission is transmitted (FIG. 7). For example, 16 slots may be set in the case that the uplink data is transmitted, and 10 slots may be set in the case that the uplink data transmission is canceled.

In a case that the terminal apparatus receives the uplink grant for the corresponding data transmission cancelled (pre-empted data) during the timer 2 being running (in the slot n+5 in the example of FIG. 11), the terminal apparatus, immediately after transmitting the data corresponding to the cancelled HARQ process ID, starts the timer 1 for the corresponding HARQ process and stops the timer 2 for the corresponding HARQ process. Here, the HARQ process ID for the uplink data transmission is notified using the DCI format used for the uplink grant. The timer 1 may be drx-HARQ-RTT-TimerUL, and the drx-HARQ-RTT-TimerUL may be the minimum period before the uplink HARQ retransmission grant (UL HARQ retransmission grant) is expected by the MAC entity. In other words, a period during the timer 1 being running, in which the base station apparatus performs demodulation/decoding processing on the uplink data, refers to a period in which there is no ACK/NACK for the uplink data transmission. Thus, the blind decoding may be stopped during a period in which the blind decoding may be stopped (a period not during an On period) according to the configuration of the DRX and a period during the timer 1 running. The timer 1 may be configured in a range from 0 to 56 OFDM symbols. Accordingly, in a case that the uplink data transmission in FIG. 11 is canceled, the base station apparatus does not need to demodulate/decode the uplink data, and thus, the timer 2 is invoked (ran) without using the timer 1.

Figure 12:
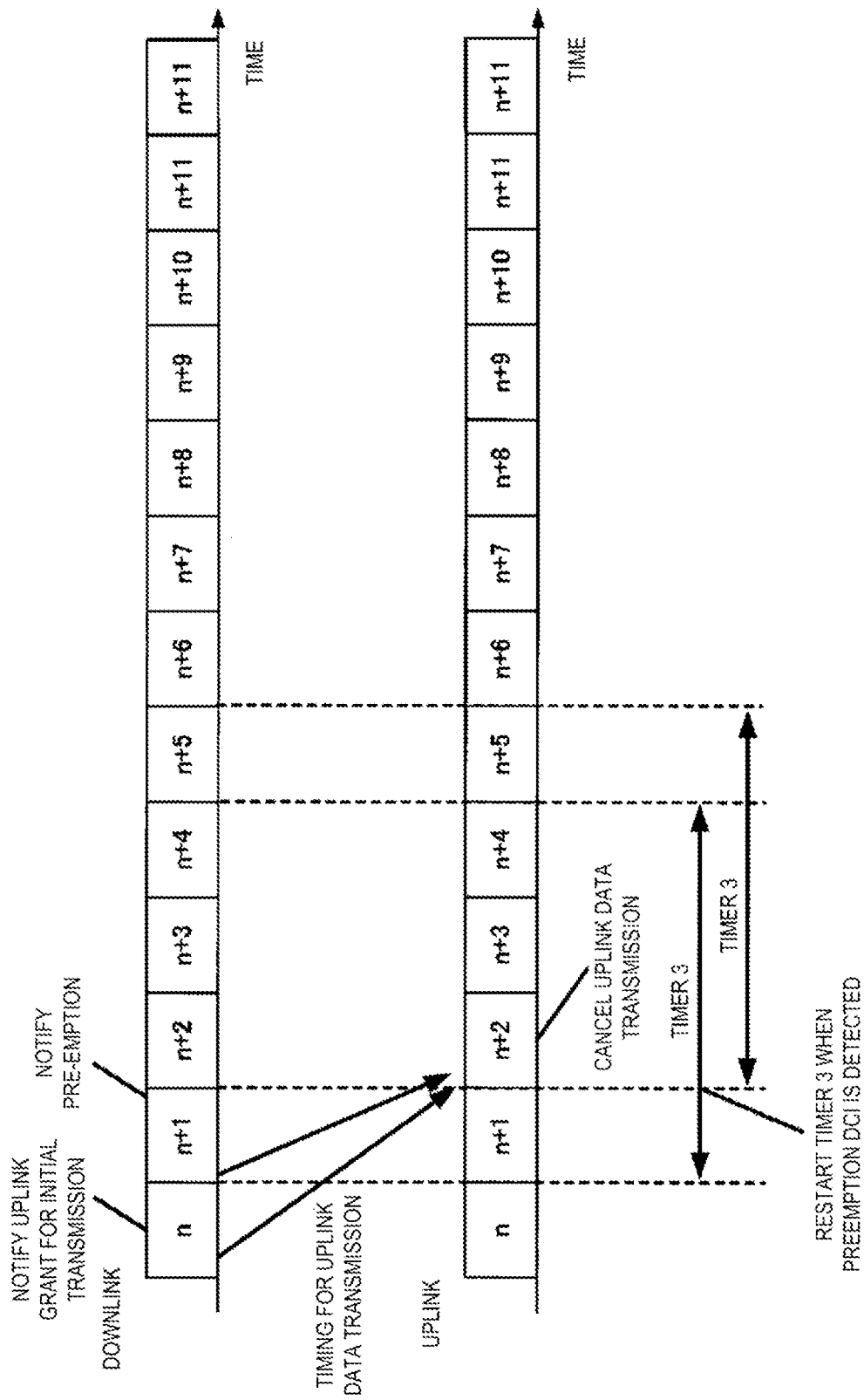
FIG. 12 is a diagram illustrating an example of a stop of uplink data transmission according to the first implementation.

FIG. 12 illustrates an example of the stop of the uplink data transmission according to the first implementation. The figure illustrates a timer that is controlled in a case that uplink data transmission is allocated based on the uplink grant, and thereafter, the DCI for pre-emption is received, and then, the uplink data transmission is cancelled. A horizontal axis in the figure represents a time and may be a slot/mini slot (Non-Slot or less than 14 multiple OFDM symbols)/OFDM symbol, and is described as a slot. First, the base station apparatus notifies the uplink grant in a slot n using the DCI format on the PDCCH. The uplink grant is notified using DCI format 0_0 or 0_1 or is notified using another DCI format. The uplink grant may include information of the frequency resource (resource block, resource block group, subcarrier) used by the terminal apparatus for uplink data transmission, and a relative time from the slot n to an uplink data transmission timing (e.g. in a case that the relative time is k, the slot n+k is the uplink data transmission timing), the number of OFDM symbols and a starting position of the OFDM symbol to be used in the slot at the uplink data transmission timing, and the number of continuous OFDM symbols. The uplink grant may notify the data transmission in multiple slots, and in a case that the relative time indicating the uplink data transmission timing is k, in a case that the data transmission is allowed from the slot n+k to the slot n+k+n', the uplink grant includes information of n'.

In a case of detecting the uplink grant by the blind decoding of the PDCCH, the terminal apparatus transmits the uplink data at the uplink data transmission timing specified by the uplink grant (that is n+2 in the example of FIG. 12, and the relative time k to the data transmission timing is k=2), but cancels the uplink data transmission in the slot n+2 in a case of detecting the notification of the pre-emption on the PDCCH using the DCI format in the slot n+1. It's noted that the uplink grant includes the HARQ process number (e.g., four bits), and the terminal apparatus cancels the data transmission based on the uplink grant corresponding to the HARQ process number specified by the uplink grant.

In FIG. 12, in a case that the PDCCH indicates the uplink grant for the initial transmission (uplink new transmission), a timer 3 is started (invoked/ran/started). The timer 3 may be drx-InactivityTimer, and drx-InactivityTimer may be a period after a PDCCH occasion for the PDCCH (uplink grant or downlink grant) indicating the initial uplink or downlink user data transmission of the MAC entity. Next, in a case of detecting the notification of the pre-emption on the PDCCH using the DCI format in the slot n+1 when timer 3 is running, the timer 3 is restarted in the same manner as in receiving the uplink grant. This is in order to avoid a matter in which the base station apparatus may continuously transmit the uplink grant or the downlink grant, and in the case that any grant is received, in a case that the timer 3 is in the period during which the blind decoding may not be performed (a period not during an On period) according to the configuration of the DRX, the grant cannot be continuously detected. Thus, in a case that the timer 3 expires immediately after detecting the DCI format for the pre-emption, the terminal apparatus may stop the blind decoding. Therefore, in the present implementation, the notification of the pre-emption is handled similarly to the grant, and a period until expiration can be reserved by restarting the timer 3. It's noted that drx-InactivityTimer may be set any among {1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms}. The timer 3 may respectively have a setting of the period of the timer for detecting the uplink grant and a setting of the period of the timer for detecting the pre-emption, and the period of the timer for detecting the uplink grant may be 10 ms and the period of the timer for detecting the pre-emption may be 20 ms.

It's noted that the notification of the pre-emption using the DCI described in the present implementation may be a notification using the same number of bits as DCI format 0_0 with the CRC scrambled with INT-RNTI/UL-INT-RNTI, a notification using the same number of bits as DCI format 0_1 with the CRC scrambled with INT-RNTI/UL-INT-RNTI, a notification using the same number of bits as DCI format 2_1 with the CRC scrambled with UL-INT-RNTI different from INT-RNTI, a notification specific to the UE using the number of bits of a DCI format with the CRC scrambled with INT-RNTI/UL-INT-RNTI defined to be dedicated to a notification of the uplink pre-emption, a notification to a group of UE to which the same INT-RNTI/UL-INT-RNTI is notified in advance, or a notification to the UE in the same serving cell/BWP.

In the present implementation, the timer is controlled not only in the case that the terminal apparatus performs the uplink data transmission, but also in the case that the terminal apparatus cancels the uplink data transmission. As a result, the notification of the uplink grant can be efficiently realized in the case that the uplink data transmission is canceled, and an increase in power consumption caused by the terminal apparatus continuing to perform the blind decoding and the unnecessary SR transmission can be avoided.

Second Implementation

The present implementation describes a method for notifying allocation information of the uplink data transmission cancelled using the DCI format notifying of the pre-emption. A communication system according to the present implementation includes the base station apparatus 10 and the terminal apparatus 20 illustrated in FIGS. 3, 4, 5, and 6. Differences from/additions to the first implementation will be mainly described below.

In the previous implementation, the pre-emption using the DCI is notified to cancel the uplink data transmission, but the present implementation describes an example in which an alternate resource for transmitting the pre-empted data is notified together with the notification of the pre-emption using the DCI.

Figure 13:
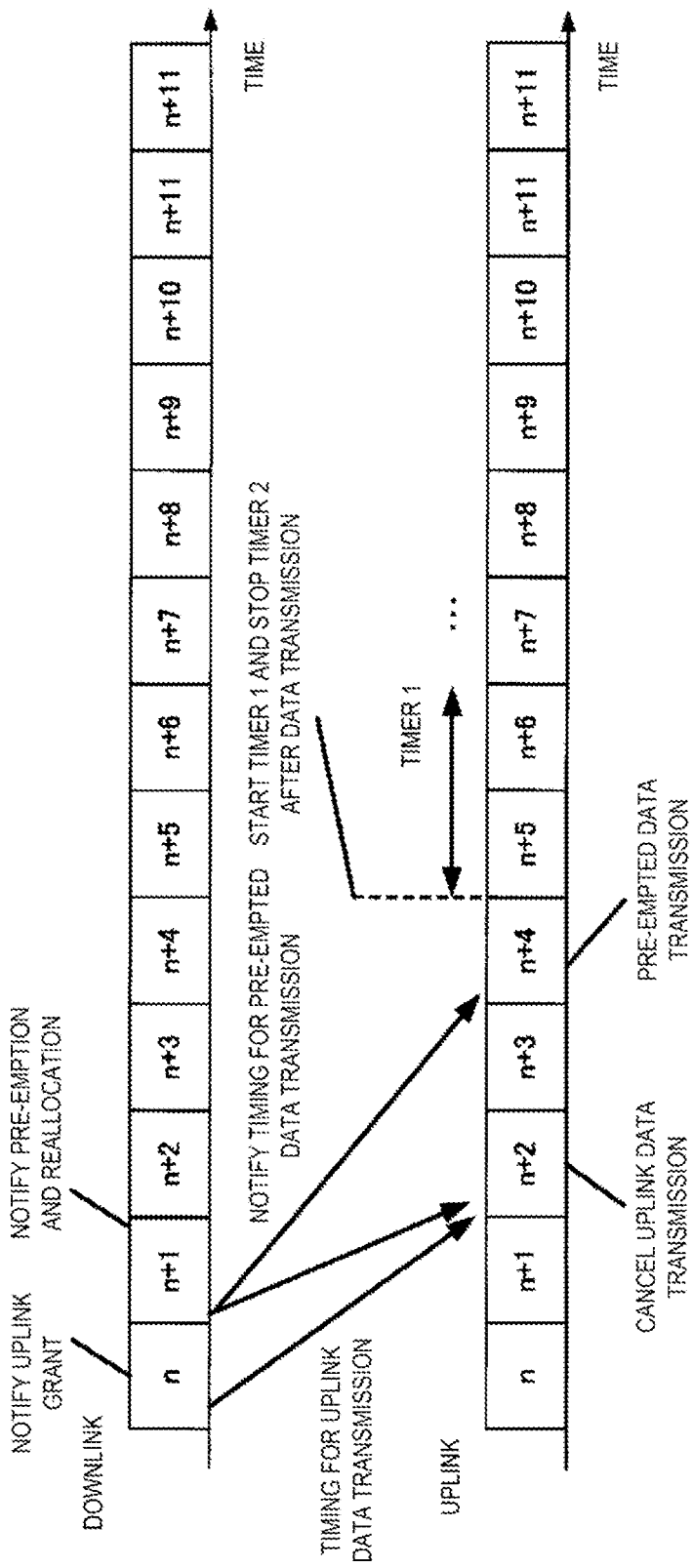
FIG. 13 is a diagram illustrating an example of an uplink data transmission according to a second implementation.

FIG. 13 illustrates an example of an uplink data transmission according to a second implementation. The figure illustrates control of the alternate resource for transmitting the pre-empted data in a case that uplink data transmission is allocated based on the uplink grant, and thereafter, the DCI for pre-emption is received, and then, the uplink data transmission is cancelled. A horizontal axis in the figure represents a time and may be a slot/mini slot (Non-Slot or less than 14 multiple OFDM symbols)/OFDM symbol, and is described as a slot. First, the base station apparatus notifies the uplink grant in a slot n using the DCI format on the PDCCH. The uplink grant is notified using DCI format 0_0 or 0_1 or is notified using another DCI format. The uplink grant may include information of the frequency resource (resource block, resource block group, subcarrier) used by the terminal apparatus for uplink data transmission, and a relative time from the slot n to an uplink data transmission timing (e.g. in a case that the relative time is k, the slot n+k is the uplink data transmission timing), the number of OFDM symbols and a starting position of the OFDM symbol to be used in the slot at the uplink data transmission timing, and the number of continuous OFDM symbols. The uplink grant may notify the data transmission in multiple slots, and in a case that the relative time indicating the uplink data transmission timing is k, in a case that the data transmission is allowed from the slot n+k to the slot n+k+n', the uplink grant includes information of n'.

In a case of detecting the uplink grant by the blind decoding of the PDCCH, the terminal apparatus transmits the uplink data at the uplink data transmission timing specified by the uplink grant (that is n+2 in the example of FIG. 13, and the relative time k to the data transmission timing is k=2), but cancels the uplink data transmission in the slot n+2 in a case of detecting the notification of the pre-emption on the PDCCH using the DCI format in the slot n+1. It's noted that the uplink grant includes the HARQ process number (e.g., four bits), and the terminal apparatus cancels the data transmission based on the uplink grant corresponding to the HARQ process number specified by the uplink grant.

Furthermore, the DCI format for the detected pre-emption notification may include information on the timing (time domain resource assignment) for transmitting the uplink data transmission canceled in the slot n+2. In this case, the timing information may notify a relative time L from the slot n+1 of the pre-emption notification. In the case of FIG. 13, L=3 holds, and the terminal apparatus performs, in slot n+4, the uplink data transmission cancelled in the slot n+2. It's noted that the timing information may be a relative time from the slot (slot n) in which the uplink grant for the uplink data transmission cancelled is detected. It's noted that the timing information may be a relative time from the slot (slot n+2) for the uplink data transmission cancelled. Here, the terminal apparatus may use transmission parameters notified using DCI format 0_0 or 0_1 in the slot n (frequency domain resource assignment, MCS, frequency hopping flag, RV, NDI, HARQ process number, TPC command for PUSCH, UL/SUL (Supplemental UL) indicator, or the like) to transmit the uplink data by changing only the transmission timing.

Furthermore, the DCI format for the detected pre-emption notification may include frequency domain resource assignment or MCS, besides the information on the timing for transmitting the uplink data transmission canceled in the slot n+2. This is in order to allow the frequency domain resource assignment and the MCS to be re-specified in accordance with scheduling conditions and the like because the timing of uplink data transmission is shifted in the slot n+2.

In the present implementation, in the case that the terminal apparatus cancels the uplink data transmission, the alternate radio resource for uplink data transmission cancelled is notified using the DCI for the pre-emption. As a result, the notification of the uplink grant can be efficiently realized in the case that the uplink data transmission is canceled, and an increase in power consumption caused by the terminal apparatus continuing to perform the blind decoding and the unnecessary SR transmission can be avoided.

Third Implementation

The present implementation describes a method for notifying allocation information of the uplink data transmission cancelled using the DCI format notifying of the pre-emption. A communication system according to the present implementation includes the base station apparatus 10 and the terminal apparatus 20 illustrated in FIGS. 3, 4, 5, and 6. Differences from/additions to the first implementation will be mainly described below.

Figure 14:
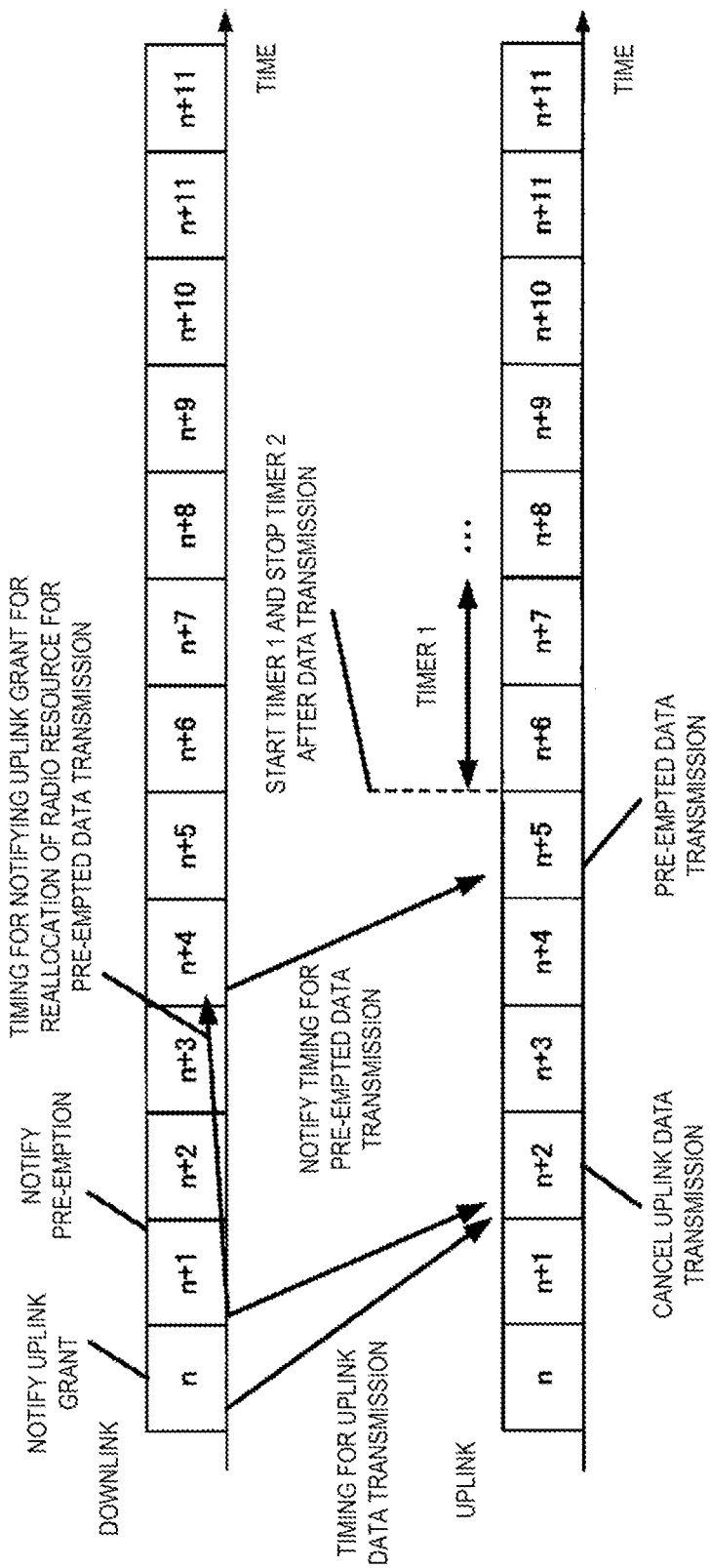
FIG. 14 is a diagram illustrating an example of an uplink data transmission according to a third implementation.

FIG. 14 illustrates an example of an uplink data transmission according to a third implementation. The figure illustrates control of the alternate resource for transmitting the pre-empted data in a case that uplink data transmission is allocated based on the uplink grant, and thereafter, the DCI for pre-emption is received, and then, the uplink data transmission is cancelled. A horizontal axis in the figure represents a time and may be a slot/mini slot (Non-Slot or less than 14 multiple OFDM symbols)/OFDM symbol, and is described as a slot. First, the base station apparatus notifies the uplink grant in a slot n using the DCI format on the PDCCH. The uplink grant is notified using DCI format 0_0 or 0_1 or is notified using another DCI format. The uplink grant may include information of the frequency resource (resource block, resource block group, subcarrier) used by the terminal apparatus for uplink data transmission, and a relative time from the slot n to an uplink data transmission timing (e.g. in a case that the relative time is k, the slot n+k is the uplink data transmission timing), the number of OFDM symbols and a starting position of the OFDM symbol to be used in the slot at the uplink data transmission timing, and the number of continuous OFDM symbols. The uplink grant may notify the data transmission in multiple slots, and in a case that the relative time indicating the uplink data transmission timing is k, in a case that the data transmission is allowed from the slot n+k to the slot n+k+n', the uplink grant includes information of n'.

In a case of detecting the uplink grant by the blind decoding of the PDCCH, the terminal apparatus transmits the uplink data at the uplink data transmission timing specified by the uplink grant (that is n+2 in the example of FIG. 14, and the relative time k to the data transmission timing is k=2), but cancels the uplink data transmission in the slot n+2 in a case of detecting the notification of the pre-emption on the PDCCH using the DCI format in the slot n+1. It's noted that the uplink grant includes the HARQ process number (e.g., four bits), and the terminal apparatus cancels the data transmission based on the uplink grant corresponding to the HARQ process number specified by the uplink grant.

Furthermore, the DCI format for the detected pre-emption notification may include timing information notifying the uplink grant to reallocate the radio resource for transmitting the cancelled data. In this case, the timing information may notify a relative time J from the slot n+1 of the pre-emption notification. In the case of FIG. 14, J=3 holds, and the terminal apparatus performs, in the slot n+4, detection of the uplink grant notifying the radio resources for the uplink data transmission cancelled in the slot n+2. It's noted that the timing information may be a relative time from the slot (slot n) in which the uplink grant for the uplink data transmission cancelled is detected. It's noted that the timing information may be a relative time from the slot (slot n+2) for the uplink data transmission cancelled. Here, the terminal apparatus detects the uplink grant using DCI format 0_0 or 0_1 in the slot n+4, and transmits the pre-empted data based on the information on the DCI detected in the slot n+4 (in the slot n+5).

In the present implementation, in the case that the terminal apparatus cancels the uplink data transmission, the timing for the uplink grant is notified for the alternate radio resource for the uplink data transmission cancelled that is notified using the DCI for the pre-emption. As a result, the notification of the uplink grant can be efficiently realized in the case that the uplink data transmission is canceled, and an increase in power consumption caused by the terminal apparatus continuing to perform the blind decoding and the unnecessary SR transmission can be avoided.

It's noted that the implementations herein may be applied in combination with multiple implementations, or each implementation only may be applied.

A program running on an apparatus according to an aspect of the present disclosure may serve as a program that controls a Central Processing Unit (CPU) and the like to cause a computer to operate in such a manner as to realize the functions of the above-described implementation according to an aspect of the present disclosure. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

It's noted that the apparatuses in the above-described implementations may be partially enabled by a computer. In that case, a program for realizing the functions of the implementations may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the above-described program may be one for realizing some of the above-described functions, and also may be one capable of realizing the above-described functions in combination with a program already recorded in a computer system.

Furthermore, each functional block or various characteristics of the apparatuses used in the above-described implementations may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

It's noted that the present disclosure is not limited to the above-described implementations. In the implementation, apparatuses have been described as an example, but the present disclosure is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The implementations of the present disclosure have been described in detail above referring to the drawings, but the specific configuration is not limited to the implementations and includes, for example, an amendment to a design that falls within the scope that does not depart from the gist of the present disclosure. Furthermore, various modifications are possible within the scope of one aspect of the present disclosure defined by claims, and implementations that are made by suitably combining technical means disclosed according to the different implementations are also included in the technical scope of the present disclosure. Furthermore, a configuration in which constituent elements, described in the respective implementations and having mutually the same effects, are substituted for one another is also included in the technical scope of the present disclosure.

INDUSTRIAL APPLICABILITY

An aspect of the present disclosure can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

10 Base station apparatus
20-1 to 20-n1 Terminal apparatus
10a Range in which the base station apparatus 10 can connect to the terminal apparatus
102 Higher layer processing unit
104 Transmitter
106 Transmit antenna
108 Controller
110 Receive antenna
112 Receiver
1040 Coding unit
1042 Modulation unit
1043 Multiple access processing unit
1044 Multiplexing unit
1046 Uplink control signal generation unit
1048 Uplink reference signal generation unit
1049 IFFT unit
1050 Radio transmitting unit
1120 Radio receiving unit
1121 FFT unit
1122 Channel estimation unit
1124 Demultiplexing unit
1126 Signal detection unit
1504 Equalization unit
1506-1 to 1506-c Multiple access signal separation unit
1510-1 to 1510-c Demodulation unit
1512-1 to 1512-c Decoding unit
202 Receive antenna
204 Receiver
206 Higher layer processing unit
208 Controller
210 Transmitter
212 Transmit antenna
2100 Coding unit
2102 Modulation unit
2106 Multiple access processing unit
2108 Multiplexing unit
2109 IFFT unit
2110 Radio transmitting unit
2112 Downlink reference signal generation unit
2113 Downlink control signal generation unit
2040 Radio receiving unit
2041 FFT unit
2042 Demultiplexing unit
2043 Channel estimation unit
2044 Signal detection unit
2504 Equalization unit
2506-1 to 2506-u Multiple access signal separation unit
2508-1 to 2508-u IDFT unit
2510-1 to 2510-u Demodulation unit
2512-1 to 2512-u Decoding unit

What is claimed is:

1. A terminal apparatus for communicating with a base station apparatus, the terminal apparatus comprising:
a control information detection unit configured to detect a first downlink control information (DCI) format and a second DCI format; and
a transmitter configured to perform uplink data transmission based on the first DCI format or cancel, by using the second DCI format, a resource scheduled, wherein:
the control information detection unit detects an uplink grant for the uplink data transmission using the first DCI format,
in a case of performing corresponding uplink data transmission based on the uplink grant, the transmitter, after the uplink data transmission, starts a first timer for a corresponding hybrid automatic repeat request (HARQ) process and stops a second timer for the corresponding HARQ process, and in a case that the first timer expires, the transmitter starts the second timer for the corresponding HARQ process, and
in a case that cancellation of the uplink data transmission based on the uplink grant using the second DCI format is detected, the transmitter, at a timing for the corresponding data transmission canceled, restarts the second timer in a case that the first timer for the corresponding HARQ process expires and the second timer is running, and starts the second timer in a case that the second timer is not running.

2. The terminal apparatus according to claim 1, wherein different periods are configured for a second timer configured to start after the first timer expires and for a second timer configured to start at the timing for the corresponding data transmission canceled.

3. The terminal apparatus according to claim 1, wherein a third timer is provided, the third timer being configured to start in a case that the uplink grant using the first DCI format is detected, and in a case that cancellation of the uplink data transmission based on the uplink grant using the second DCI format is detected, the third timer is restarted.

4. The terminal apparatus according to claim 3, wherein different periods are configured for a third timer configured to start in a case that the uplink grant using the first DCI format is detected and a third timer configured to restart in a case that cancellation of the uplink data transmission based on the uplink grant using the second DCI format is detected.

5. The terminal apparatus according to claim 1, wherein in a case that cancellation of the uplink data transmission based on the uplink grant using the second DCI format is detected, the uplink data transmission is performed based on a transmission timing included in the second DCI format and a transmission parameter included in the first DCI format.

6. The terminal apparatus according to claim 5, wherein
in a case that cancellation of the uplink data transmission based on the uplink grant using the second DCI format is detected, the uplink data transmission is performed based on a transmission timing and a modulation and coding scheme (MCS), and a frequency domain resource assignment included in the second DCI format, and a transmission parameter that is not included in the second DCI format, but included in the first DCI format.

7. The terminal apparatus according to claim 1, wherein
in a case of cancellation of the uplink data transmission based on the uplink grant using the second DCI format is detected, an uplink grant for reallocation is detected based on a notification timing for the uplink grant included in the second DCI format.

* * * * *